US010970055B2

(12) United States Patent
Inagaki et al.

(10) Patent No.: US 10,970,055 B2
(45) Date of Patent: Apr. 6, 2021

(54) IDENTIFYING SOFTWARE AND HARDWARE BOTTLENECKS

(71) Applicant: INTERNATIONAL BUSINESS MACHINES CORPORATION, Armonk, NY (US)

(72) Inventors: Tatsushi Inagaki, Kanagawa-ken (JP); Yohei Ueda, Tokyo (JP); Moriyoshi Ohara, Kanagawa-ken (JP); Yu Chin Fabian Lim, Singapore (SG); Chun Hui Suen, Tampines (SG); Venkatraman Ramakrishna, Singapore (SG); Takuya Nakaike, Kanagawa-ken (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/106,456

(22) Filed: Aug. 21, 2018

(65) Prior Publication Data
US 2020/0065077 A1    Feb. 27, 2020

(51) Int. Cl.
*G06F 9/44* (2018.01)
*G06F 8/41* (2018.01)
(Continued)

(52) U.S. Cl.
CPC ............ *G06F 8/433* (2013.01); *G06F 8/4441* (2013.01); *G06F 9/52* (2013.01); *G06F 16/9024* (2019.01)

(58) Field of Classification Search
CPC .............................. G06F 11/3466; G06F 8/433
(Continued)

(56) References Cited

U.S. PATENT DOCUMENTS

| 6,513,155 B1 * | 1/2003 | Alexander, III .... G06F 11/3409 |
| | | 717/124 |
| 6,751,789 B1 * | 6/2004 | Berry .................. G06F 11/3466 |
| | | 714/35 |

(Continued)

OTHER PUBLICATIONS

Tatsushi Inagaki, YoheiYohei Ueda, Takuya Nakaike, Moriyoshi Ohara: "Profile-based Detection of Layered Bottlenecks"—IBM Research—Tokyo; ICPE 2019 at Mumbai, India—Apr. 10, 2019.*

(Continued)

*Primary Examiner* — Francisco J Aponte
(74) *Attorney, Agent, or Firm* — Tutunjian & Bitetto, P.C.; Randall Bluestone

(57) ABSTRACT

A method is provided for building calling context trees of an application to identify a thread or a device affecting a throughput of a transaction relating to the application. The method obtains profiles of call stacks of multiple threads. The method obtains wake-up profiles which are the call stacks of a notifier thread and a waiter thread, from among the multiple threads, in a case that the waiter thread leaves from a sleep state. The method builds the calling context trees to indicate transitions of methods tracing callee relations and wake-up relations based on the profiles of the call stacks and the wake-up profiles, wherein each method is represented by a node having an average thread number. The method extracts and displays tree portions which are transitively reachable from a calling context tree for the transaction and which include the thread or device affecting throughput.

20 Claims, 21 Drawing Sheets

(51) Int. Cl.
*G06F 9/52* (2006.01)
*G06F 16/901* (2019.01)
(58) Field of Classification Search
USPC .................................................. 717/127, 144
See application file for complete search history.

(56) References Cited

U.S. PATENT DOCUMENTS

| | | | |
|---|---|---|---|
| 7,076,784 B1 | 7/2006 | Russell et al. | |
| 7,167,821 B2* | 1/2007 | Hardwick | G06F 9/5011 703/17 |
| 7,293,260 B1* | 11/2007 | Dmitriev | G06F 11/3466 714/E11.207 |
| 7,401,324 B1* | 7/2008 | Dmitriev | G06F 8/443 717/130 |
| 7,747,653 B2* | 6/2010 | Srinivas | G06F 11/3612 707/797 |
| 7,926,043 B2* | 4/2011 | Vaswani | G06F 11/3466 717/130 |
| 8,099,631 B2* | 1/2012 | Tsvetkov | G06F 11/3636 714/38.11 |
| 8,214,806 B2* | 7/2012 | Cong | G06F 11/3447 717/127 |
| 8,214,812 B2* | 7/2012 | Romanovskiy | G06F 9/45508 717/139 |
| 8,468,502 B2 | 6/2013 | Lui et al. | |
| 8,566,795 B2* | 10/2013 | DeWitt, Jr. | G06F 11/3466 717/126 |
| 8,627,317 B2 | 1/2014 | Altman et al. | |
| 8,799,874 B2* | 8/2014 | Pistoia | G06F 8/43 717/132 |
| 8,799,904 B2 | 8/2014 | Kuiper et al. | |
| 8,839,271 B2* | 9/2014 | Jones | G06F 11/3612 719/318 |
| 8,843,684 B2* | 9/2014 | Jones | G06F 9/4812 710/260 |
| 8,875,108 B2* | 10/2014 | Choi | G06F 11/3612 709/203 |
| 8,893,134 B2 | 11/2014 | Sweeney et al. | |
| 8,978,022 B2* | 3/2015 | Kalogeropulos | G06F 9/30047 717/151 |
| 8,990,792 B2* | 3/2015 | Gorelkina | G06F 11/3612 717/133 |
| 9,032,375 B2* | 5/2015 | Kumar | G06F 11/3612 717/131 |
| 9,058,421 B2* | 6/2015 | Xu | G06F 9/3808 |
| 9,176,842 B2* | 11/2015 | Chen | G06F 11/3466 |
| 9,280,444 B2 | 3/2016 | Scheerer et al. | |
| 9,323,651 B2* | 4/2016 | Garrett | G06F 8/443 |
| 9,495,201 B2 | 11/2016 | Slinger et al. | |
| 9,652,355 B2 | 5/2017 | Horikawa | |
| 9,864,672 B2* | 1/2018 | Seto | G06F 11/3636 |
| 10,025,650 B2* | 7/2018 | Beard | G06F 11/0706 |
| 10,102,104 B2* | 10/2018 | Braun | G06F 11/36 |
| 10,205,640 B2* | 2/2019 | Chan | G06F 9/4881 |
| 10,338,990 B2* | 7/2019 | Khan | G06F 11/0751 |
| 10,417,111 B2* | 9/2019 | Chan | G06F 11/3466 |
| 2007/0220513 A1* | 9/2007 | Hwang | G06F 9/524 718/1 |
| 2008/0046673 A1* | 2/2008 | Hwang | G06F 12/023 711/170 |
| 2008/0109796 A1 | 5/2008 | Kosche | |
| 2008/0148241 A1* | 6/2008 | Jones | G06F 11/3471 717/130 |
| 2009/0320021 A1* | 12/2009 | Pan | G06F 11/3476 718/100 |
| 2011/0191774 A1* | 8/2011 | Hsu | G06F 9/46 718/100 |
| 2011/0258608 A1* | 10/2011 | Li | G06F 11/3644 717/127 |
| 2011/0283266 A1* | 11/2011 | Gallagher | G06F 9/44 717/130 |
| 2012/0185732 A1* | 7/2012 | Sankar | G06F 11/366 714/38.1 |
| 2012/0185735 A1* | 7/2012 | Sambamurthy | G06F 11/3452 714/47.1 |
| 2012/0185736 A1* | 7/2012 | Sambamurthy | G06F 11/079 714/47.3 |
| 2012/0278793 A1* | 11/2012 | Jalan | G06F 11/323 717/158 |
| 2013/0104097 A1* | 4/2013 | Durbha | G06F 17/5045 716/133 |
| 2013/0232476 A1* | 9/2013 | Varma | G06F 8/443 717/150 |
| 2014/0310235 A1* | 10/2014 | Chan | G06F 16/285 707/603 |
| 2015/0106794 A1* | 4/2015 | Rhee | G06F 11/3419 717/133 |
| 2015/0150020 A1 | 5/2015 | Duttagupta et al. | |
| 2015/0199254 A1* | 7/2015 | Vesepogu | G06F 11/3466 717/130 |
| 2015/0220420 A1* | 8/2015 | Boneti | G06F 11/3636 714/37 |
| 2016/0078069 A1* | 3/2016 | Tiwari | G06F 16/1737 707/693 |
| 2016/0098341 A1* | 4/2016 | Pho | G06F 11/323 714/38.1 |
| 2017/0322861 A1* | 11/2017 | Chan | G06F 9/50 |
| 2017/0322877 A1* | 11/2017 | Chan | G06F 9/5022 |
| 2018/0063210 A1* | 3/2018 | Cook | G06F 15/16 |
| 2018/0074854 A1* | 3/2018 | Chan | G06F 11/3442 |
| 2018/0314451 A1* | 11/2018 | Ellison | G06F 9/4493 |
| 2019/0196937 A1* | 6/2019 | Wang | H04L 43/022 |
| 2019/0347125 A1* | 11/2019 | Sankaran | G06F 9/3004 |

OTHER PUBLICATIONS

Murray Woodside et al.; "Transformation challenges: from software models to performance models"; Softw Syst Model (2014) 13: 1529-1552.*

Greg Franks et al.; "Layered Bottlenecks and Their Mitigation"; Third International Conference on the Quantitative Evaluation of Systems (QEST'06).*

Casale et al., "Bottlenecks Identification in Multiclass Queueing Networks using Convex Polytopes", Proceedings of the The IEEE Computer Society's 12th Annual International Symposium on Modeling, Analysis, and Simulation of Computer and Telecommunications Systems (MASCOTS'04), Oct. 2004, 8 pages.

Hofer et al., "Efficient Tracing and Versatile Analysis of Lock Contention in Java Applications on the Virtual Machine Level", ICPE'16, Mar. 2016, pp. 263-274.

* cited by examiner

```
package main
import "time"
var c chan bool = make(chan bool)

func main() {
    go sender()
    for i := 0; i < 10; i++ {
        go receiver()
    }
} func sender() {
    for true {
        time.Sleep(time.Duration(1) * time.Millisecond)
        c <- true
    }
} func receiver() {
    for true {
        _ = <-c
        time.Sleep(time.Duration(1) * time.Nanosecond)
    }
}
```

FIG. 17

IDENTIFYING SOFTWARE AND HARDWARE BOTTLENECKS

BACKGROUND

Technical Field

The present invention generally relates to computing devices, and more particularly to identifying software and hardware bottlenecks.

Description of the Related Art

Software and hardware bottlenecks are a significant problem for computing devices. However, it is not trivial to identify software and hardware bottlenecks in the scalability of a modern server-side application according to parameters such as the number of transactions, client, and processors. The challenges are software bottlenecks due to multiprocessing and multithreading, intensive use of mutual exclusion and inter-thread communication, a modular architecture with pluggable components, and a rapid cycle of development.

Analytical models such as queuing networks do not help in practice. While a simple model such as a separable queuing network cannot model software bottlenecks, a complex model such as a layered queuing network requires the hierarchy of all components in advance of the analysis.

Moreover, conventional approaches for identifying bottlenecks based on profiling cannot exactly identify bottleneck resources since these conventional approaches do not evaluate the structure of the target application.

Hence, there is a need for an improved approach to identifying software and hardware bottlenecks.

SUMMARY

According to an aspect of the present invention, a computer-implemented method is provided for building calling context trees of a target application to identify a thread, from among multiple threads, or a hardware device, from among a set of hardware devices, affecting a throughput of a transaction relating to the target application. The method includes obtaining profiles of call stacks of the multiple threads. The method further includes obtaining wake-up profiles which are the call stacks of a notifier thread and a waiter thread, from among the multiple threads, in a case that the waiter thread leaves from a sleep state. The method also includes building the calling context trees to indicate transitions of methods tracing callee relations and wake-up relations based on the profiles of the call stacks and the wake-up profiles. Each of the methods is represented by a node having an average thread number. The method additionally includes extracting and displaying one or more tree portions, from among one or more of the calling context trees, which are transitively reachable from a calling context tree for the transaction and which include the thread or the hardware device affecting the throughput of the transaction.

According to another aspect of the present invention, a computer program product is provided for building calling context trees of a target application to identify a thread, from among multiple threads, or a hardware device, from among a set of hardware devices, affecting a throughput of a transaction relating to the target application. The computer program product includes a non-transitory computer readable storage medium having program instructions embodied therewith. The program instructions are executable by a computer to cause the computer to perform a method. The method includes obtaining profiles of call stacks of the multiple threads. The method further includes obtaining wake-up profiles which are the call stacks of a notifier thread and a waiter thread, from among the multiple threads, in a case that the waiter thread leaves from a sleep state. The method also includes building the calling context trees to indicate transitions of methods tracing callee relations and wake-up relations based on the profiles of the call stacks and the wake-up profiles. Each of the methods is represented by a node having an average thread number. The method additionally includes extracting and displaying one or more tree portions, from among one or more of the calling context trees, which are transitively reachable from a calling context tree for the transaction and which include the thread or the hardware device affecting the throughput of the transaction.

According to yet another aspect of the present invention, a computer processing system is provided for building calling context trees of a target application to identify a thread, from among multiple threads, or a hardware device, from among a set of hardware devices of the computer processing system, affecting a throughput of a transaction relating to the target application. The computer processing system includes a memory for storing program code. The computer processing system further includes a processor device operatively coupled to the memory for running the program code to obtain profiles of call stacks of the multiple threads. The processor device further runs the program code to obtain wake-up profiles which are the call stacks of a notifier thread and a waiter thread, from among the multiple threads, in a case that the waiter thread leaves from a sleep state. The processor device also runs the program code to build the calling context trees to indicate transitions of methods tracing callee relations and wake-up relations based on the profiles of the call stacks and the wake-up profiles. Each of the methods is represented by a node having an average thread number. The processor device additionally runs the program code to extract and display one or more tree portions, from among one or more of the calling context trees, which are transitively reachable from a calling context tree for the transaction and which include the thread or the hardware device affecting the throughput of the transaction.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein:

FIG. 17 is a diagram showing an exemplary code listing corresponding to calling context tree 1600 of FIG. 16, in accordance with an embodiment of the present invention;

DETAILED DESCRIPTION

Figure 1:
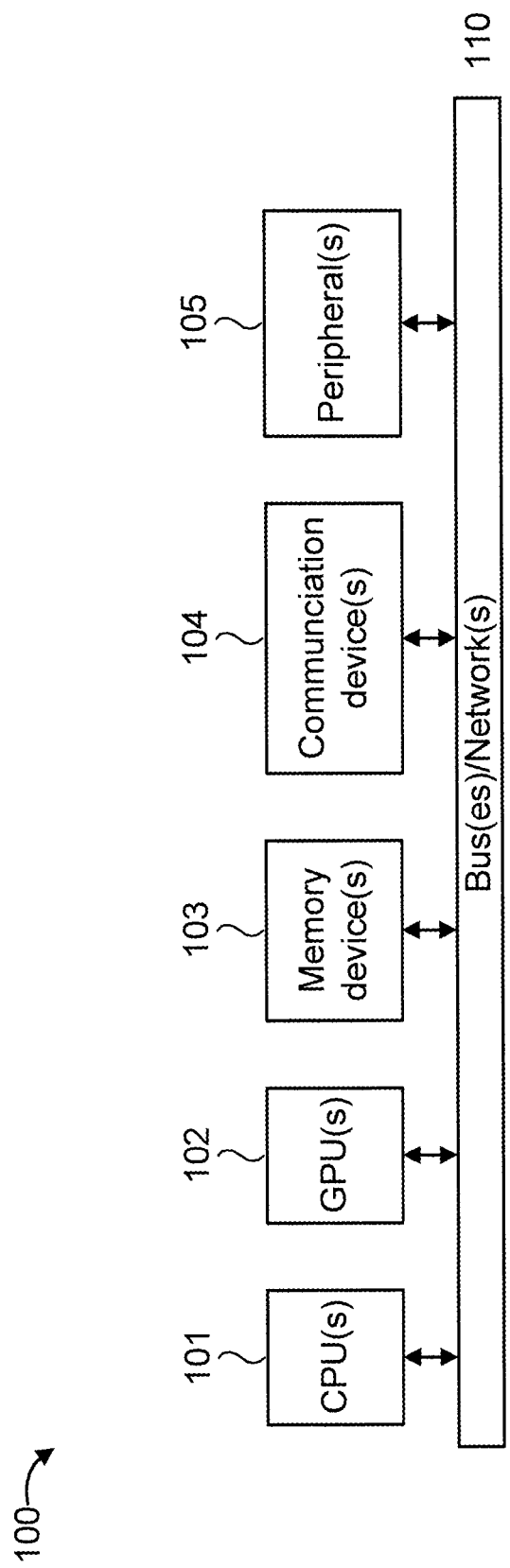
FIG. 1 is a block diagram showing an exemplary processing system to which the present invention may be applied, in accordance with an embodiment of the present invention.

The present invention is directed to identifying software and hardware bottlenecks.

In an embodiment, the present invention identifies both software and hardware bottlenecks by assuming the performance of the target application can be modeled as a conceptual layered queuing network (LQN) whose queue lengths are measured from thread profiles sampled on the application. Given a thread profile, in an embodiment, the present invention constructs tasks with numbers of threads as queue lengths in the LQN. Then the invention builds a task dependency graph which represents request-service relationships among tasks, from a given wake-up profile. Then, the present invention identifies a sequence of the bottleneck task at each layer having the largest number of threads, by top-down traversal from a given root task.

A thread profile takes a snapshot of call stacks of all the existing threads, both runnable and blocked in the target application, at a requested timing. The thread profile is usually provided by programming languages or by operating systems, and can be used to build a call graph or calling context tree of functions which are executed by the profiled threads.

For example, the package pprof in the Go programming language provides the goroutine profile. This profile gives a set of records corresponding to threads. Each record includes: (a) a unique identifier of a thread; (b) the current status of the thread, that is, runnable or blocked due to some reason; (c) the call stack of the thread; and (d) the statement where the thread was created.

One or more embodiments of the present invention involve profiling of call stacks. Call stacks are created for each thread using a call stack space, where each thread has its own stack (i.e., its own call space portion) in the call stack space. In the operation of a call stack, the caller pushes a return address onto the stack, and the called subroutine, when it finishes, pulls or pops the return address off the call stack and transfers control to that address. If a called subroutine calls on yet another subroutine, it will push another return address onto the call stack, and so on, with the information stacking up and unstacking as the target application dictates. A call stack of a thread can include, for example, but is not limited to, the (aforementioned) return address, a function and an offset. As used herein, the terms "caller" and "callee" refer to two dependent functions in a calling context tree of the same thread. Since a wake-up profile records the calling contexts of two different threads, the terms "notifier thread" and "waiter thread" are used to emphasize their roles in synchronization.

A wake-up profile gives a set of sampled events such that a runnable notifier thread wakes up a blocked waiter thread via synchronization. More specifically, each event record has: (a) the call stack of a notifier thread at the synchronization; and (b) the call stack of a waiter thread at the synchronization.

While the wake-up profile is not yet supported by the existing programming languages, it can be implemented by extending the runtime library of the target language.

For example, the Go programming language implements user-level multithreads called goroutines and has its custom goroutine scheduler in the package runtime. When a runnable goroutine makes another blocked goroutine runnable, the notifier goroutine invokes the function goready, where a wake-up event can be sampled.

For each event record in a wake-up profile, the two stack top frames of the notifier thread and the waiter thread in the calling context tree are merged as a super node. The super node is used to detect a dependency from the waiter task to the notifier task, which was described above.

A task represents software or hardware resource in the LQN. In the present invention, a task is either of the followings: (a) a thread task, which represents a set of threads created at a specific statement of the target application to execute a given root function; (b) a blocking task, which represents a software resource such as a mutual exclusion lock, communication channel, I/O channel, sleep timer, and operating system, which can make a thread blocked state; (c) a processor task, which represents processors as a hardware resource; or (d) a custom thread task, which represents a sub-tree starting from a specified function in the calling context tree of a thread task or another custom thread task.

Tasks are built from multiple samples of thread profiles, which are collected periodically based on an external timer. A thread count is associated to each task, which is an arithmetic mean of the number of threads per sample. Since a task is considered as a resource in the LQN, the thread count corresponds to a mean queue lengths of the corresponding resource.

A dependency from a task to another task represents that the former waiter task waits for service from the latter notifier task. More specifically, a dependency is one of the following: (a) a dependency from a (custom) thread task to a processor task represents that threads of the waiter task are runnable; (b) a dependency from a (custom) thread task to a blocking task represents that threads of the waiter task are blocked due to the blocking status of the notifier task; (c) a dependency from a (custom) thread task to a custom thread task represents that threads of the waiter task invoke the root function of the notifier task; or (d) a dependency from a blocking task to a (custom) thread task represents that blocked threads of the waiter task are waken up by threads of the notifier task. The dependencies (a) and (b) are extracted from calling context trees in sampled thread profiles of the target application. The dependency (c) is specified by a user of this invention. The dependency (d) is extracted from wake-up profiles of the target application.

One of the many attendant advantages of the present invention is that the present invention does not have to develop a separate model for performance analysis, but instead can identify bottlenecks by using standard thread profiles which the underlying programming language provides. These and other advantages of the present invention are readily determined by one of ordinary skill in the art, given the teachings of the present invention provided herein, while maintaining the spirit of the present invention.

FIG. 1 is a block diagram showing an exemplary processing system 100 to which the present invention may be applied, in accordance with an embodiment of the present invention. The processing system 100 includes a set of processing units (CPUs) 101, a set of GPUs 102, a set of memory devices 103, a set of communication devices 104, and set of peripherals 105. The CPUs 101 can be single or multi-core CPUs. The GPUs 102 can be single or multi-core GPUs. The one or more memory devices 103 can include caches, RAMs, ROMs, and other memories (flash, optical, magnetic, etc.). The one or more memory devices 103 can be used to implement stacks and/or other data structures involved and/or otherwise implicated by one or more embodiments of the present invention. The communication devices 104 can include wireless and/or wired communication devices (e.g., network (e.g., WIFI, etc.) adapters, etc.). The peripherals 105 can include a display device, a user input device, a printer, and so forth. Elements of processing system 100 are connected by one or more buses or networks (collectively denoted by the figure reference numeral 110).

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. Further, in another embodiment, a cloud configuration can be used (e.g., see FIGS. 12-13). These and other variations of the processing system 100 are readily contemplated by one of ordinary skill in the art given the teachings of the present invention provided herein.

Moreover, it is to be appreciated that various figures as described below with respect to various elements and steps relating to the present invention that may be implemented, in whole or in part, by one or more of the elements of system 100.

Figure 2:
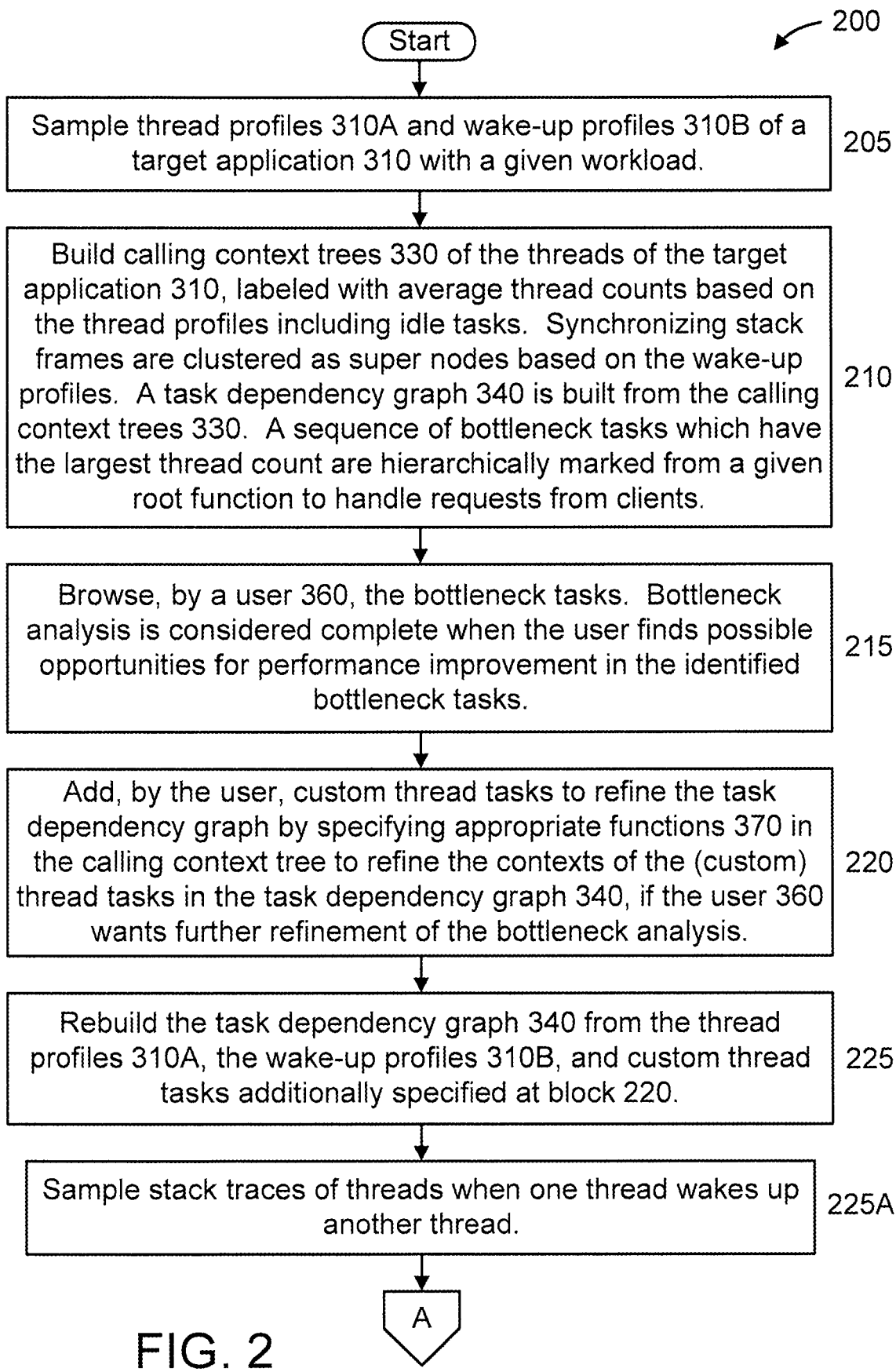
FIGS. 2-3 are flow diagrams showing an exemplary method for identifying software and hardware bottlenecks, in accordance with an embodiment of the present invention.
Figure 3:
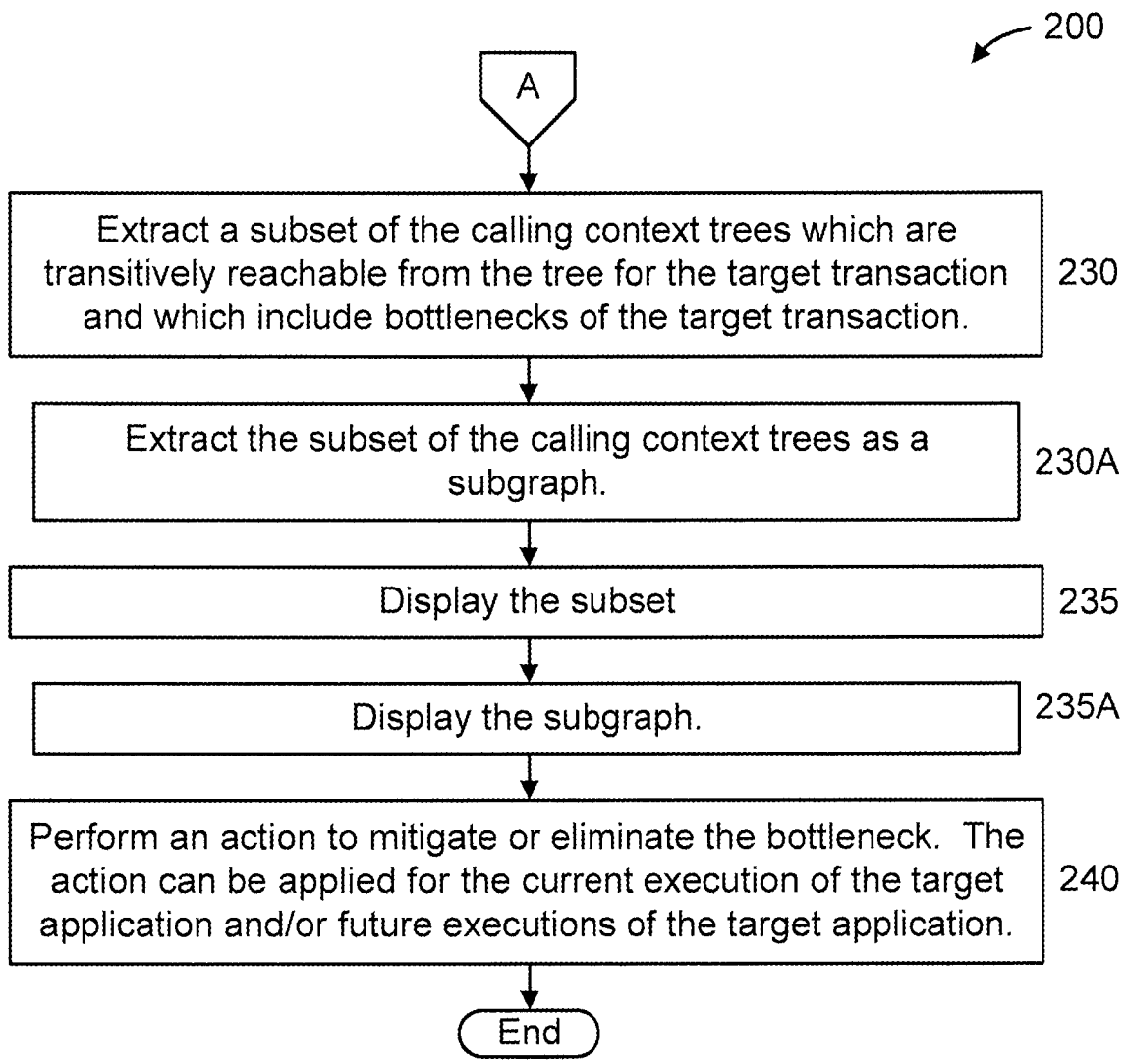
Figure 4:
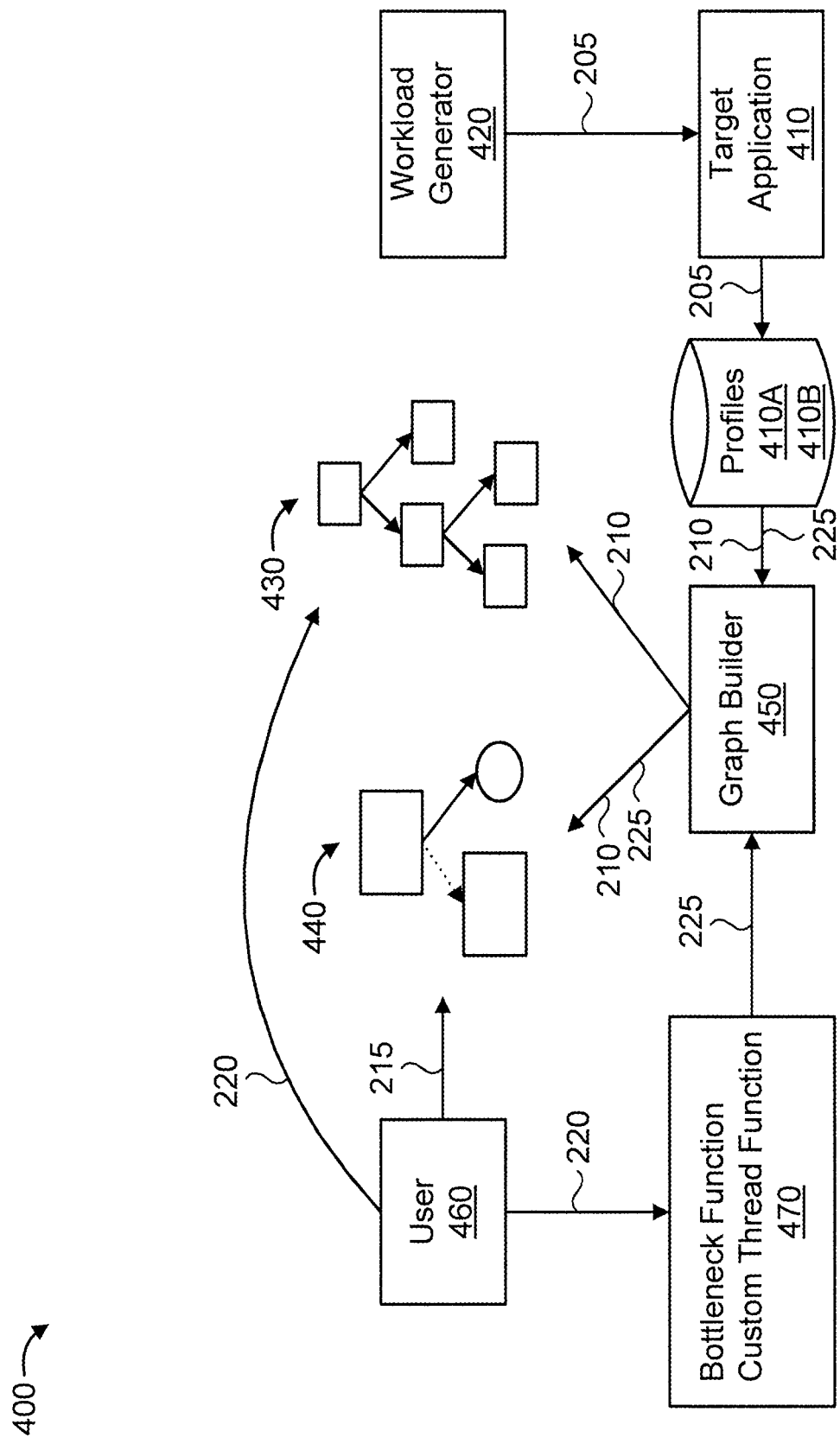
FIG. 4 is a block diagram graphically showing the method of FIG. 2, in accordance with an embodiment of the present invention.

FIGS. 2-3 are flow diagrams showing an exemplary method 200 for identifying software and hardware bottlenecks, in accordance with an embodiment of the present invention. FIG. 4 is a block diagram graphically showing method 200 of FIG. 2, in accordance with an embodiment of the present invention.

At block 205, sample thread profiles 410A and wake-up profiles 410B of a target application 410 with a given workload provided by a workload generator 420.

At block 210, build calling context trees 430 of the threads of the target application, labeled with average thread counts based on the thread profiles 410A including idle tasks. Synchronizing stack frames are clustered as super nodes based on the wake-up profiles. A task dependency graph 440 is built by a graph builder 450 from the calling context trees 430. A sequence of bottleneck tasks which have the largest thread count are hierarchically marked from a given root function to handle requests from clients.

At block 215, browse, by a user 460, the bottleneck tasks. Bottleneck analysis is considered complete when the user finds possible opportunities for performance improvement in the identified bottleneck tasks.

At block 220, add, by the user, custom thread tasks to refine the task dependency graph by specifying appropriate functions 470 in the calling context tree to refine the contexts of the (custom) thread tasks in the task dependency graph, if the user 460 wants further refinement of the bottleneck analysis.

At block 225, rebuild the task dependency graph 440 from the thread profiles 410A, the wake-up profiles 410B, and custom thread tasks additionally specified at block 220.

In an embodiment, block 225 can include block 225A.

At block 225A, sample stack traces of threads when one thread wakes up another thread.

At block 230, extract a subset of the calling context trees which are transitively reachable from the tree for the target transaction and which include bottlenecks of the target transaction.

In an embodiment, block 230 can include block 230A.

At block 230A, extract the subset of the calling context trees as a subgraph.

At block 235, display the subset.

In an embodiment, block 235 can include block 235A.

At block 235A, display the subgraph.

At block 240, perform an action to mitigate or eliminate the bottleneck. The action can be applied for the current execution of the target application and/or future executions of the target application. The action can be, for example, but is not limited to, increasing the number of software resources by modifying the configuration of the target application, reducing the processor cycles spent in the bottleneck operation by allocating important data on a faster storage, eliminating the contented mutual exclusion lock by modifying the source code, and so on. The action can be performed by the user or can be performed automatically depending upon the implementation. In an embodiment, the action can be tailored to overcome the specific bottleneck that is encountered.

Figure 5:
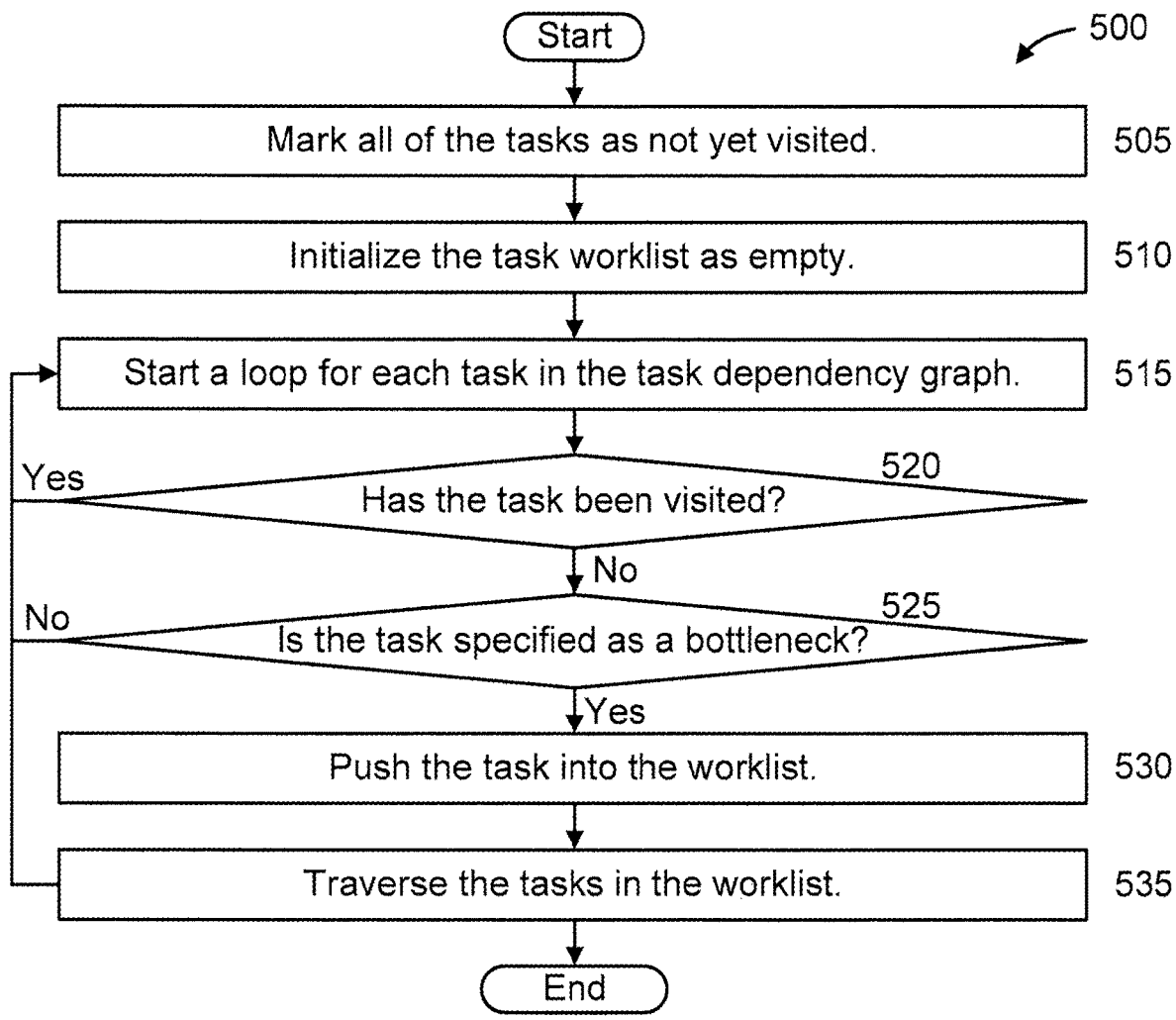
FIG. 5 is a flow diagram showing an exemplary method for identifying bottleneck tasks, in accordance with an embodiment of the present invention.

FIG. 5 is a flow diagram showing an exemplary method 500 for identifying bottleneck tasks, in accordance with an embodiment of the present invention.

At block 505, mark all of the tasks as not yet visited.

At block 510, initialize the task worklist as empty.

At block 515, start a loop for each task in the task dependency graph.

At block 520, determine whether the (current) task has been visited. If so, then return to step 515. Otherwise, proceed to block 525.

At block 525, determine whether the task is specified as a bottleneck. If so, then proceed to block 530. Otherwise, return to block 515.

At block 530, push the task into the worklist.

At block 535, traverse the tasks in the worklist.

Figure 6:
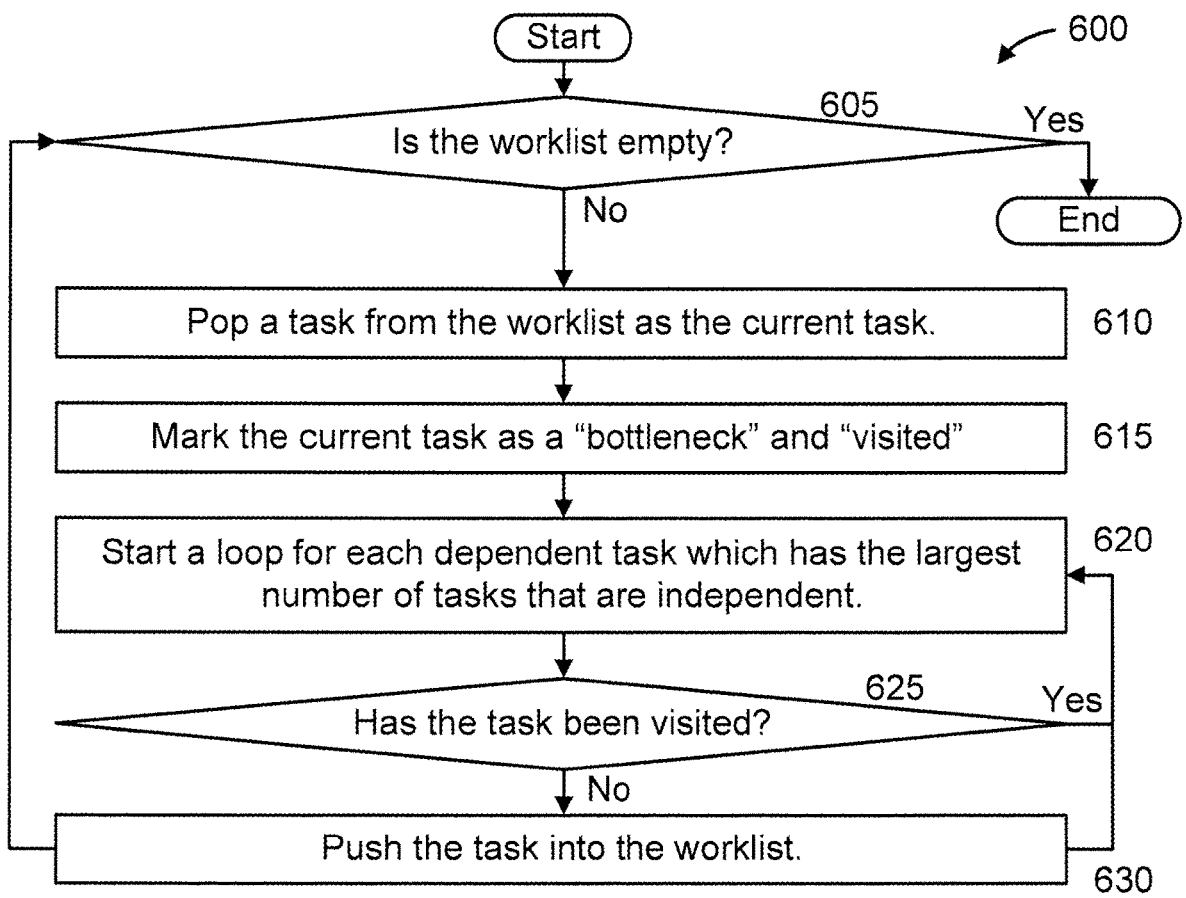
FIG. 6 is a flow diagram showing an exemplary method for traversing tasks in a worklist, in accordance with an embodiment of the present invention.

FIG. 6 is a flow diagram showing an exemplary method 600 for traversing tasks in a worklist, in accordance with an embodiment of the present invention. Method 600 can be considered to represent an embodiment of block 535 of method 500.

At block 605, determine whether the worklist is empty. If so, the terminate the method. Otherwise, proceed to block 610.

At block 610, pop a task from the worklist as the current task.

At block 615, mark the current task as a "bottleneck" and "visited".

At block 620, start a loop for each dependent task which has the largest number of tasks that are independent.

At block 625, determine whether the task has been visited. If so, the return to block 620. Otherwise, proceed to block 630.

At block 630, push the task into the worklist.

Figure 7:
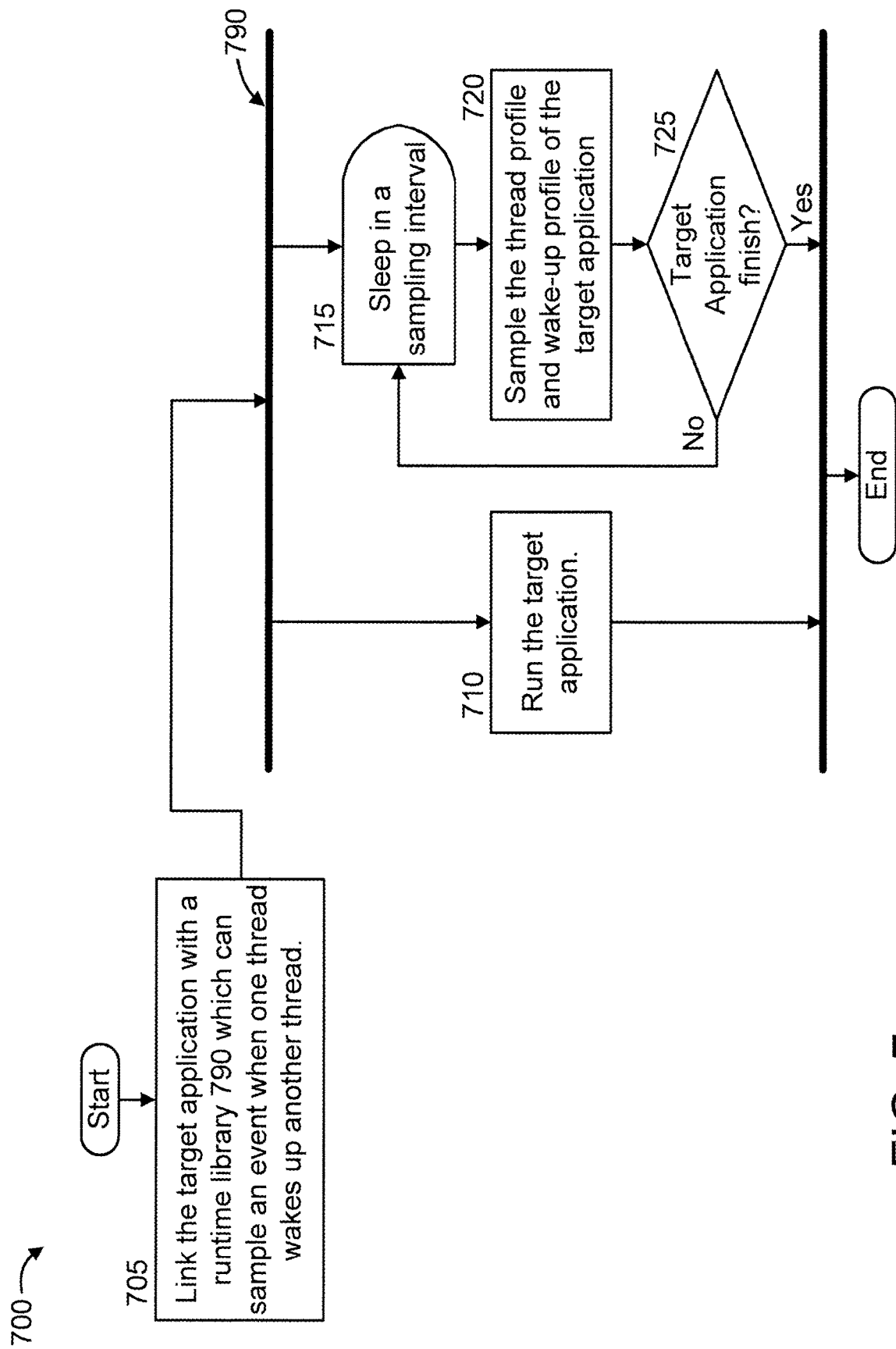
FIG. 7 is a high-level block diagram showing an exemplary method for sampling profiles, in accordance with an embodiment of the present invention.

FIG. 7 is a high-level block diagram showing an exemplary method 700 for sampling profiles, in accordance with an embodiment of the present invention. Method 700 can be considered to be an embodiment of block 205 of method 200.

At block 705, link the target application with a runtime library 790 which can sample an event when one thread wakes up another thread.

At block 710, run the target application.

At block 715, sleep in a sampling interval. This block refers to the fact that a callee thread is sleeping during a sampling interval.

At block 720, sample the thread profile and wake-up profile of the target application.

At block 725, determine whether the target application finished. If so, then terminate the method. Otherwise, return to block 715.

Figure 8:
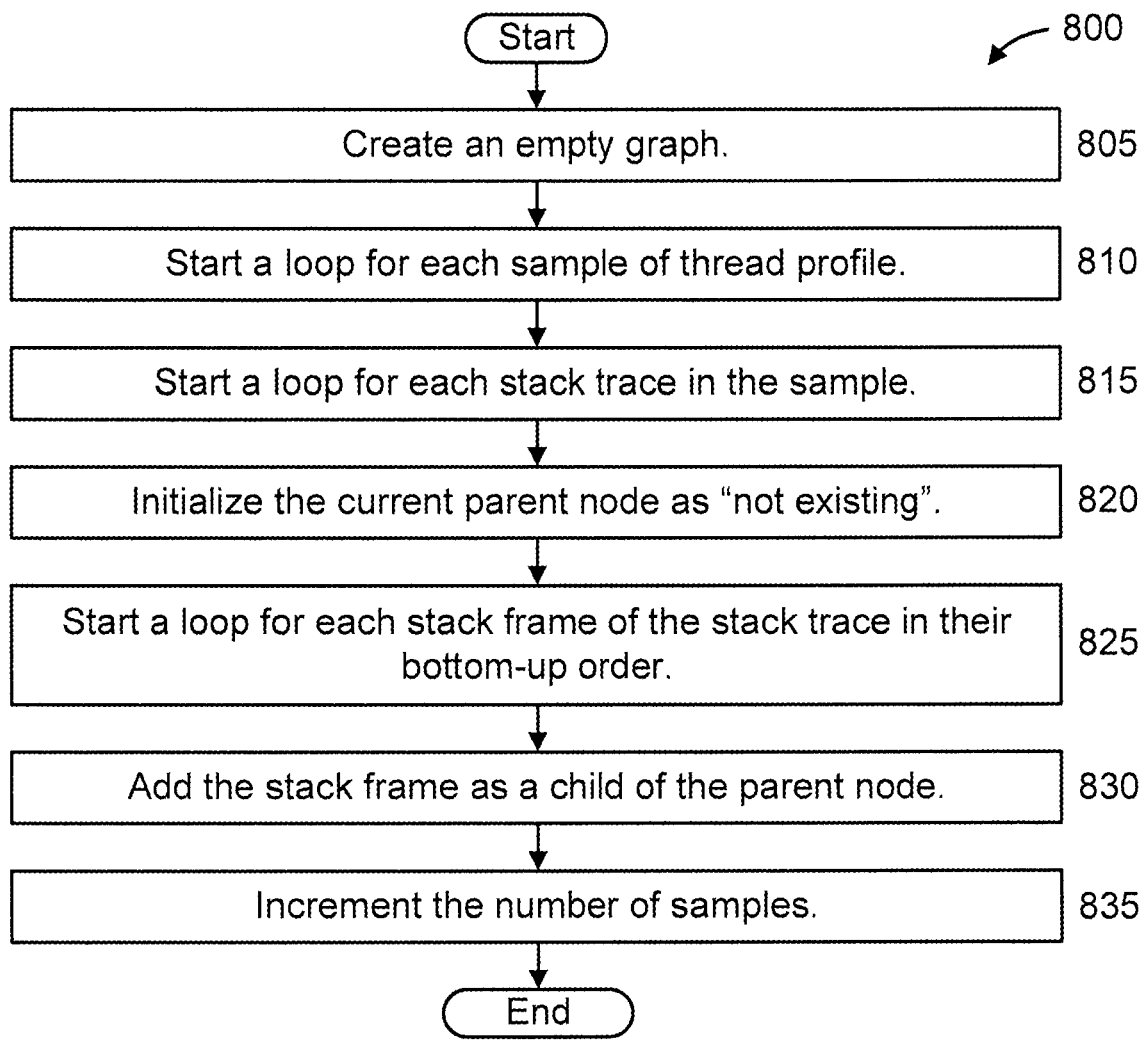
FIG. 8 is a flow diagram showing an exemplary method for building the calling context of trees of threads, in accordance with an embodiment of the present invention.

FIG. 8 is a flow diagram showing an exemplary method 800 for building the calling context of trees of threads, in accordance with an embodiment of the present invention. Method 800 can be considered to be an embodiment of block 810 of method 800.

At block 805, create an empty graph.

At block 810, start a loop for each sample of thread profile.

At block 815, start a loop for each stack trace in the sample.

At block 820, initialize the current parent node as "not existing".

At block 825, start a loop for each stack frame of the stack trace in their bottom-up order.

At block 830, add the stack frame as a child of the parent node.

At block 835, increment the number of samples.

Figure 9:
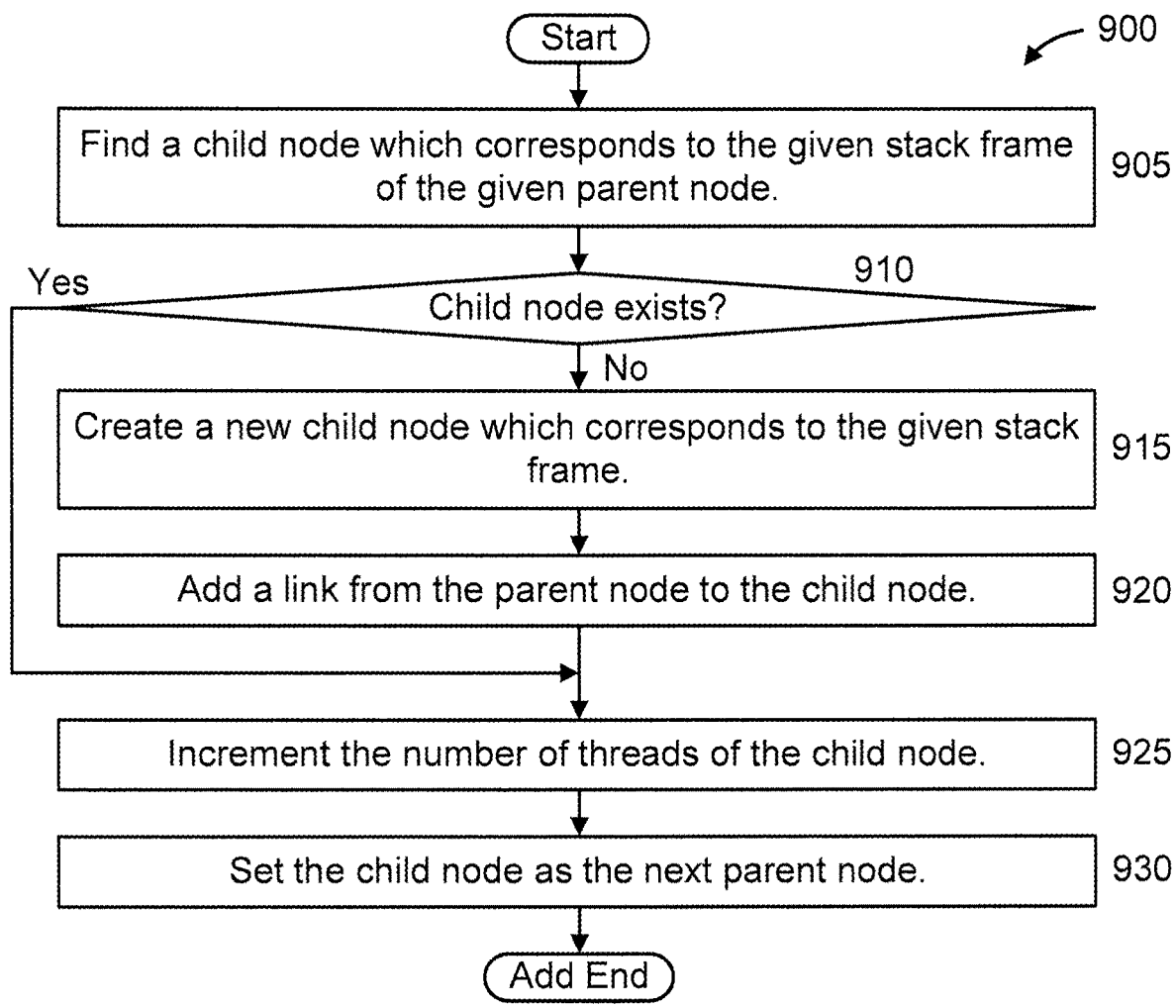
FIG. 9 is a flow diagram showing an exemplary method for adding a node to the calling context trees of threads, in accordance with an embodiment of the present invention.

FIG. 9 is a flow diagram showing an exemplary method 900 for adding a node to the calling context trees of threads, in accordance with an embodiment of the present invention.

At block 905, find a child node which corresponds to the given stack frame of the given parent node.

At block 910, determine if the child node exists. If so, then proceed to block 915. Otherwise, proceed to block 925.

At block 915, increment the number of threads of the child node.

At block 920, set the child node as the next parent node.

At block 925, create a new child node which corresponds to the given stack frame.

At block 930, add a link from the parent node to the child node.

Figure 10:
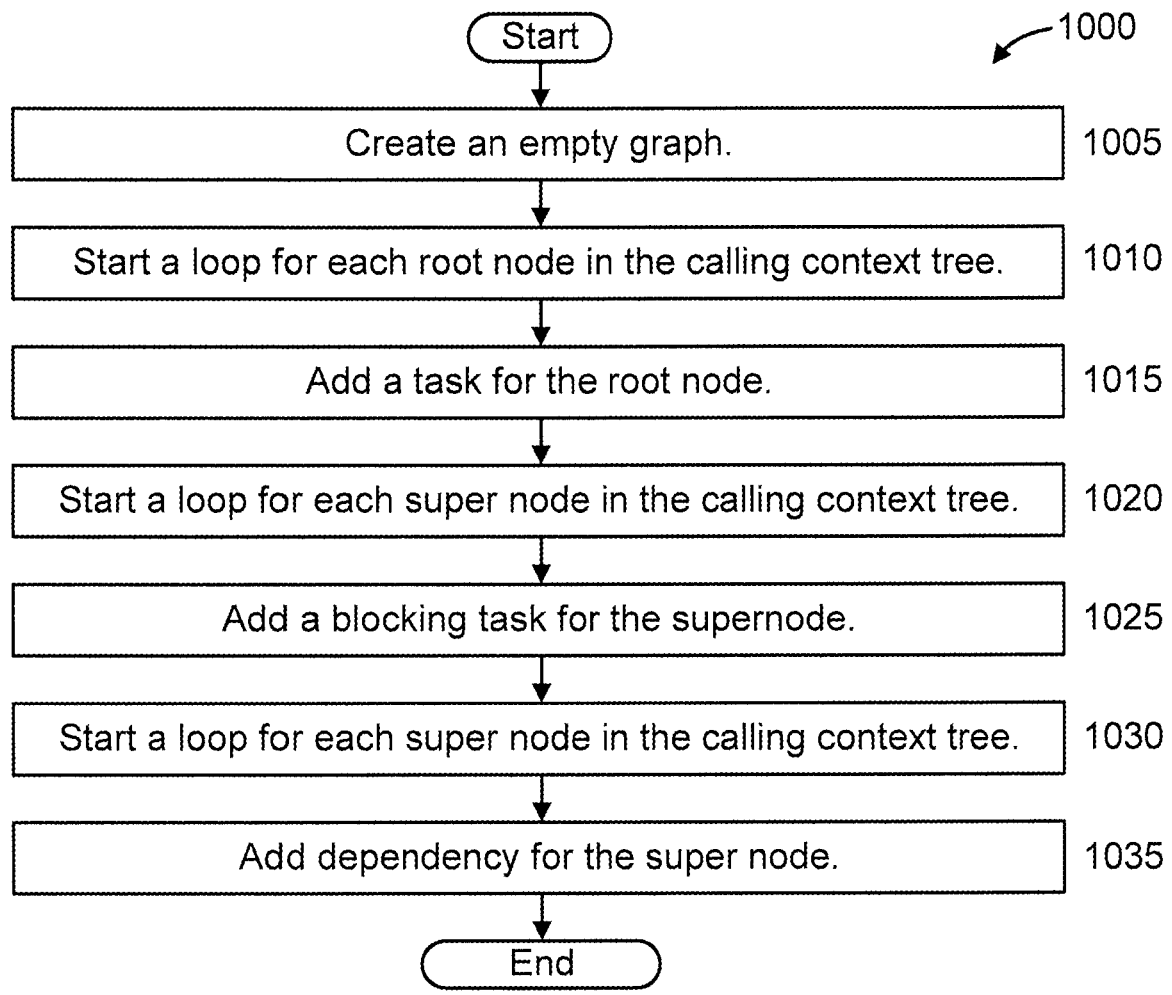
FIG. 10 is a flow chart showing an exemplary method for building a task dependency graph, in accordance with an embodiment of the present invention.

FIG. 10 is a flow chart showing an exemplary method 1000 for building a task dependency graph, in accordance with an embodiment of the present invention.

At block 1005, create an empty graph.

At block 1010, start a loop for each root node in the calling context tree.

At block 1015, add a task for the root node.

At block 1020, start a loop for each super node in the calling context tree.

At block 1025, add a blocking task for the super node.

At block 1030, start a loop for each super node in the calling context tree.

At block 1035, add dependency for the super node.

Figure 11:
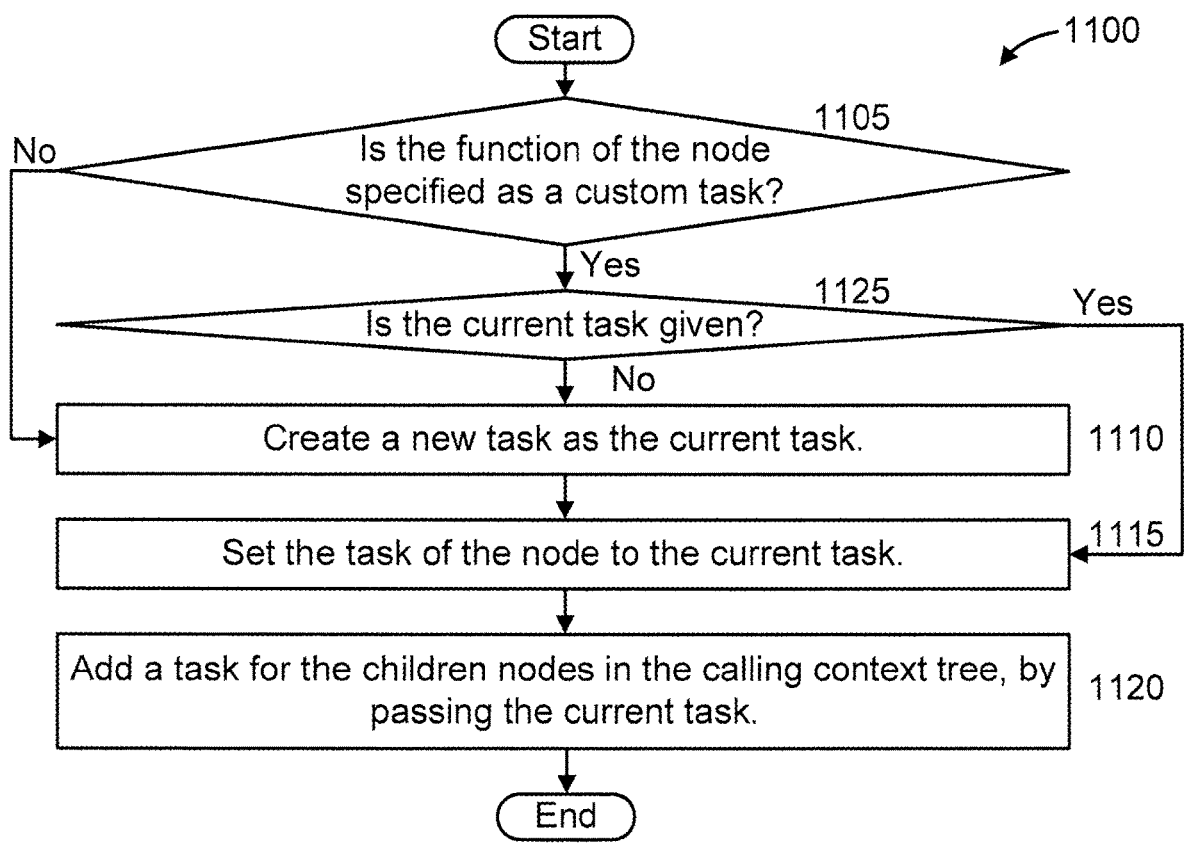
FIG. 11 is a flow diagram showing an exemplary method for adding a task to a task dependency graph, in accordance with an embodiment of the present invention.

FIG. 11 is a flow diagram showing an exemplary method 1100 for adding a task to a task dependency graph, in accordance with an embodiment of the present invention.

At block 1105, determine whether the function of the node is specified as a custom task. If so, then proceed to block 1110. Otherwise, proceed to block 1125.

At block 1110, create a new task as the current task.

At block 1115, set the task of the node to the current task.

At block 1120, add a task for the children nodes in the calling context tree, by passing the current task.

At block 1125, determine whether the current task is given. If so, then proceed to block 1115. Otherwise, proceed to block 1110.

Figure 12:
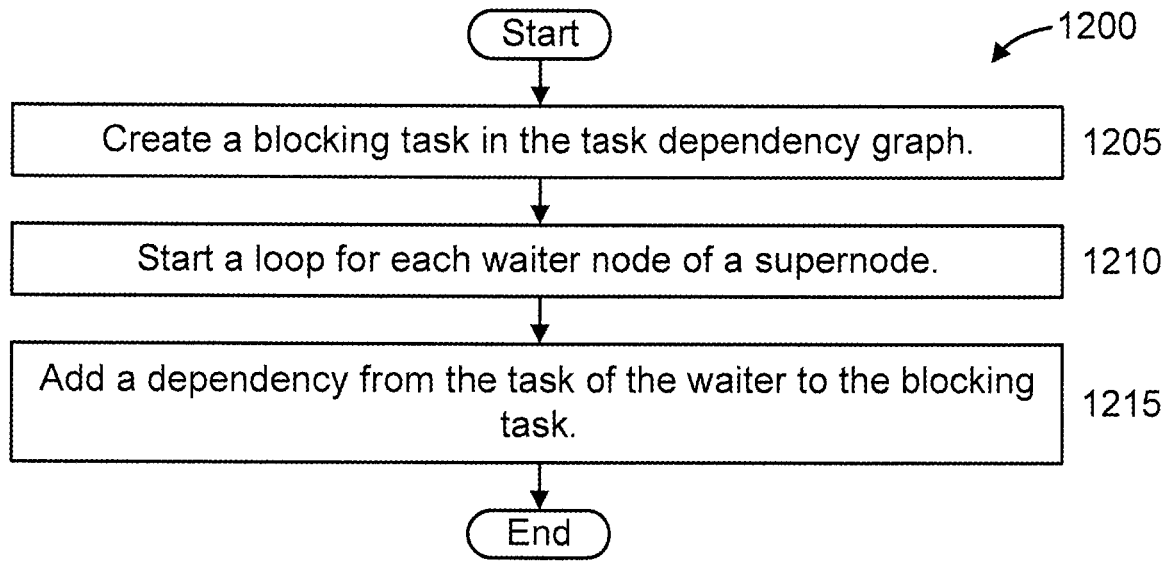
FIG. 12 is a flow diagram showing an exemplary method for adding a blocking task to a task dependency graph, in accordance with an embodiment of the present invention.

FIG. 12 is a flow diagram showing an exemplary method 1200 for adding a blocking task to a task dependency graph, in accordance with an embodiment of the present invention.

At block 1205, create a blocking task in the task dependency graph.

At block 1210, start a loop for each waiter node of a super node.

At block 1215, add a dependency from the task of the waiter to the blocking task.

Figure 13:
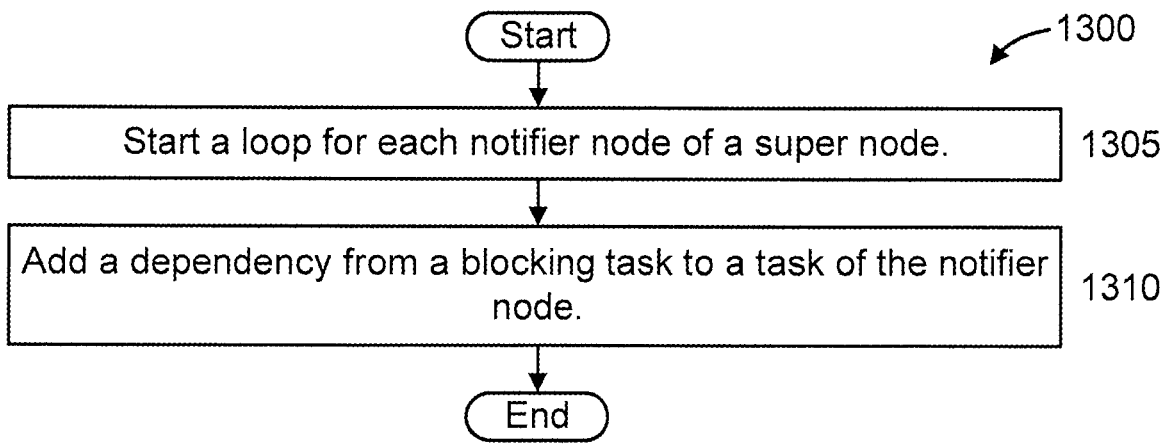
FIG. 13 is a flow diagram showing an exemplary method for adding a dependency to a task dependency graph, in accordance with an embodiment of the present invention.

FIG. 13 is a flow diagram showing an exemplary method 1300 for adding a dependency to a task dependency graph, in accordance with an embodiment of the present invention.

At block 1305, start a loop for each notifier node of a super node.

At block 1310, add a dependency from a blocking task to a task of the notifier node.

Figure 14:
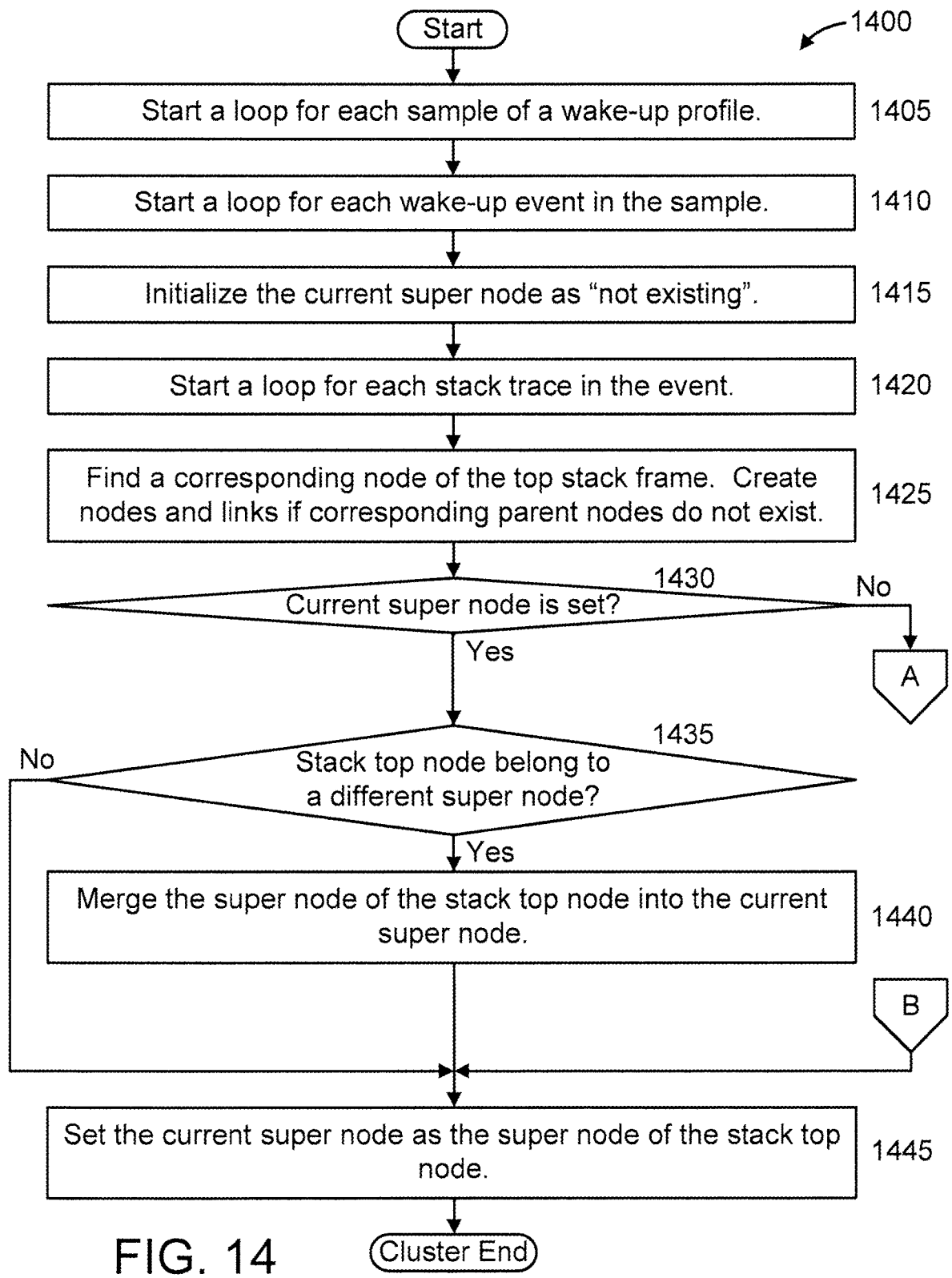
FIGS. 14-15 are flow diagrams showing an exemplary method for clustering synchronizing nodes into a super node, in accordance with an embodiment of the present invention.
Figure 15:
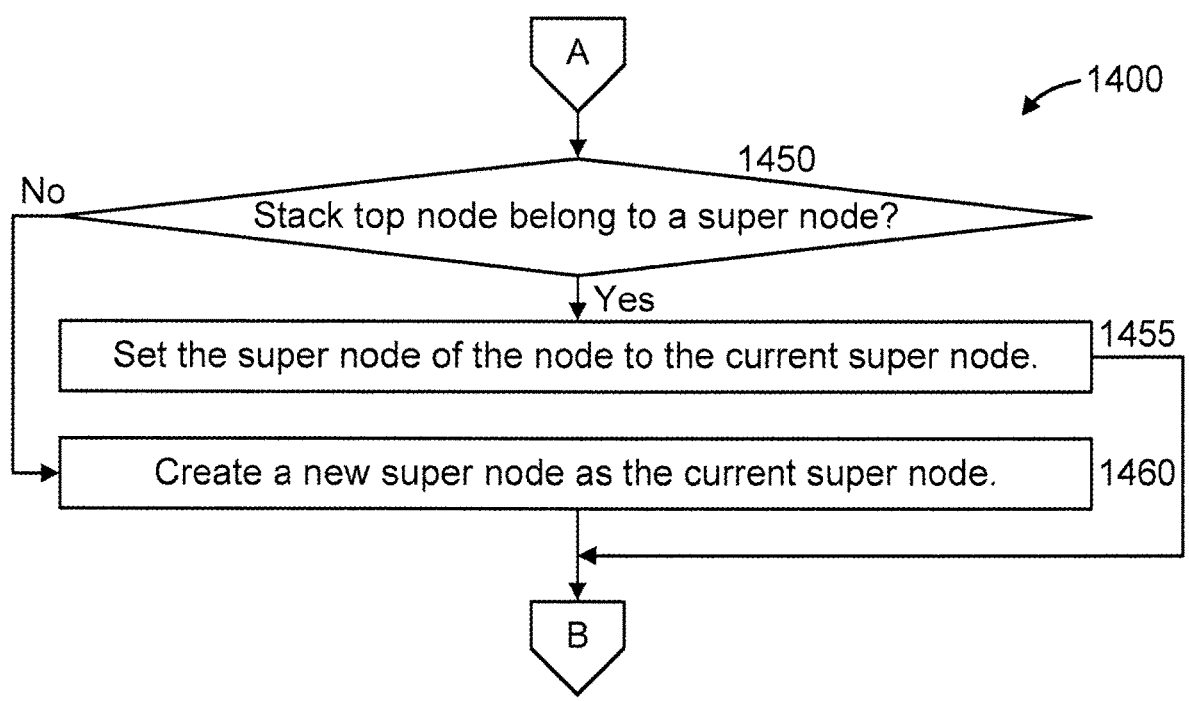

FIGS. 14-15 are flow diagrams showing an exemplary method 1400 for clustering synchronizing nodes into a super node, in accordance with an embodiment of the present invention. Method 1400 can be considered to be an embodiment of block 215 of method 200.

At block 1405, start a loop for each sample of a wake-up profile.

At block 1410, start a loop for each wake-up event in the sample.

At block 1415, initialize the current super node as "not existing".

At block 1420, start a loop for each stack trace in the event.

At block 1425, find a corresponding node of the top stack frame. Create nodes and links if corresponding parent nodes do not exist.

At block 1430, determine whether the current super node is set. If so, then proceed to block 1435. Otherwise, proceed to block 1450.

At block 1435, determine whether the stack top node belongs to a different super node. If so, then proceed to block 1440. Otherwise, proceed to block 1445.

At block 1440, merge the super node of the stack top node into the current super node.

At block 1445, set the current super node as the super node of the stack top node.

At block 1450, determine whether the stack top node belongs to a super node. If so, then proceed to block 1455. Otherwise, proceed to block 1460.

At block 1455, set the super node of the node to the current super node.

At block 1460, create a new super node as the current super node.

A further description will now be given regarding block 210 of method 200, in accordance with an embodiment of the present invention.

In an embodiment, block 210 can be considered to (a) build the calling context trees based on the call stacks in the thread profiles of the target application, (b) summarize the calling context trees into the task dependency graph based on the call stacks in the wake-up profile of the target application, and (c) enumerate a sequence of bottleneck tasks by hierarchically traversing the task graph with the largest number of threads from a given root function to handle client requests.

Figure 16:
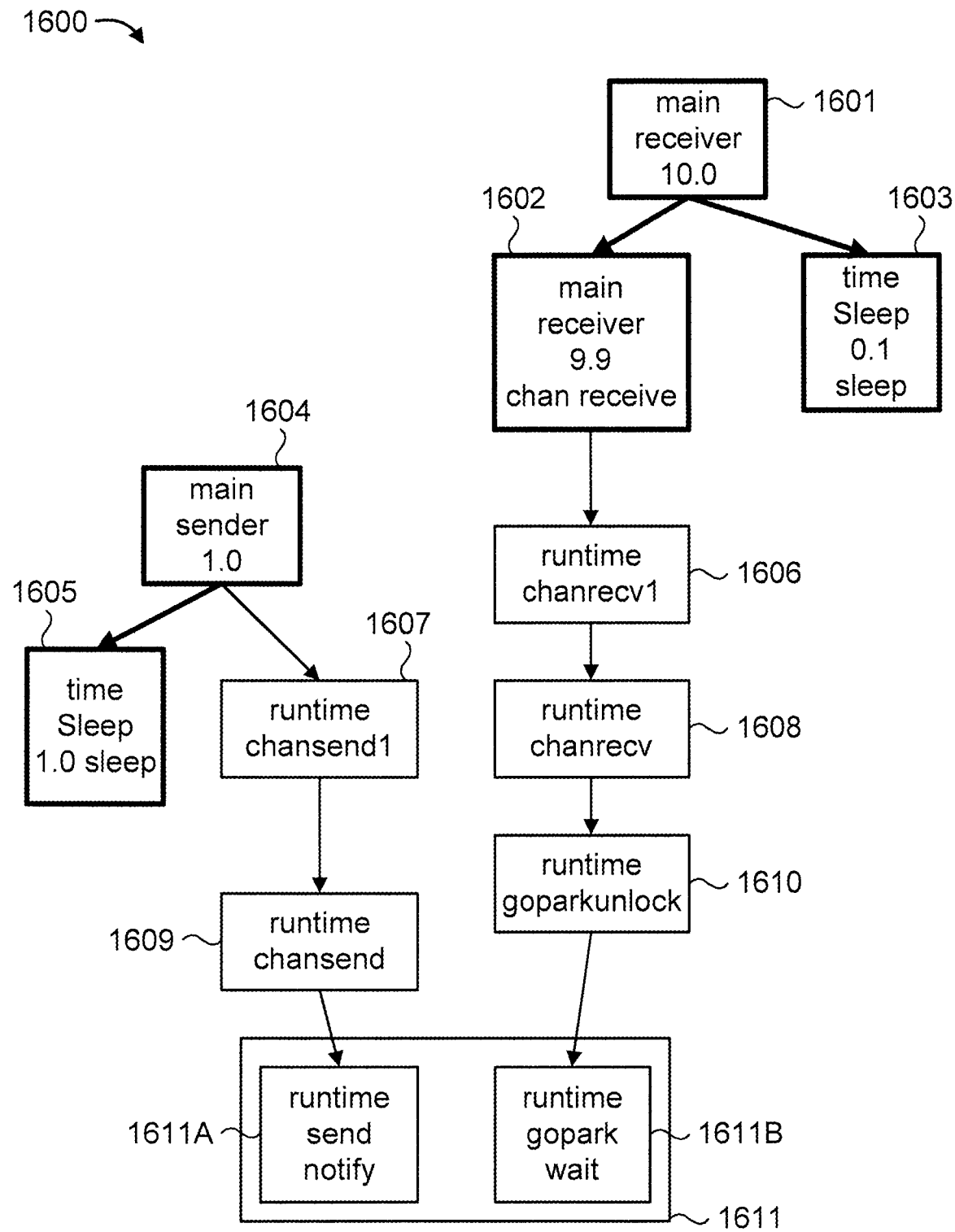
FIG. 16 is a diagram showing an exemplary calling context tree, in accordance with an embodiment of the present invention.

FIG. 16 is a diagram showing an exemplary calling context tree 1600, in accordance with an embodiment of the present invention. FIG. 17 is a diagram showing an exemplary code listing 1700 corresponding to calling context tree 1600 of FIG. 16, in accordance with an embodiment of the present invention. The nodes with bolded lines, i.e., nodes 1601-1605, are created from thread profiles. The nodes with thin (non-bolded) lines, i.e., nodes 1606-1610, are created from wake-up profiles. The nodes 1611A and 1611B enclosed in a super node 1611 represent synchronizing stack frames captured in the wake-up profiles. A graphical depiction of a calling context tree in accordance with the present invention such as tree 1600 for example can use different indicators for indicating different creations (e.g., from thread profiles or wake-up profiles) and/or indicting super node membership and/or so forth. In this way, a user who is aware of the various different visual representations (bolded lines, non-bolded lines, dashed lines, etc.) that can be used to display a calling context tree can then readily ascertain such information from the different visual representations.

Figure 18:
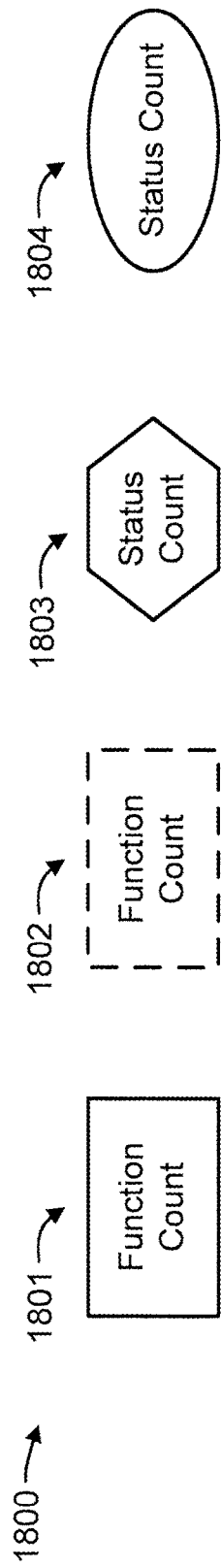
FIG. 18 is a diagram showing exemplary graphical notations of tasks, in accordance with an embodiment of the present invention.

FIG. 18 is a diagram showing exemplary graphical notations 1800 of tasks, in accordance with an embodiment of the present invention. A solid line enclosed square box 1801 represents a thread task (e.g., a function count, etc.). A dashed line enclosed square box 1802 represents a custom thread task (e.g., a function count, etc.). A hexagon 1803 represents a blocking task (e.g., a status count, etc.). An ellipse 1804 represents a processor task (e.g., a status count).

Figure 19:
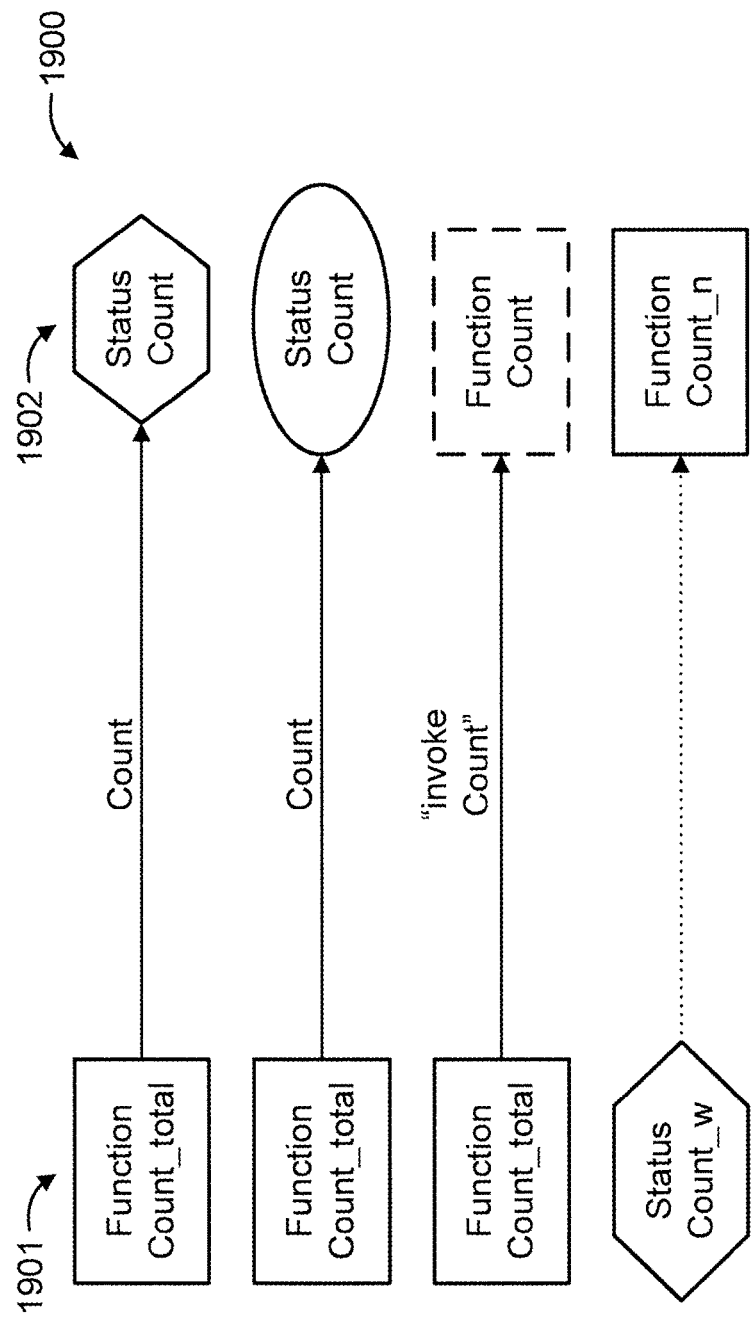
FIG. 19 is a diagram showing exemplary graphical notations of dependencies, in accordance with an embodiment of the present invention.

FIG. 19 is a diagram showing exemplary graphical notations 1900 of dependencies, in accordance with an embodiment of the present invention. Waiter thread tasks 1901 are shown on the left side, and notifier thread tasks 1902 are shown on the right side. A solid arrow, from a waiter thread task 1901 to a notifier thread task 1902, represents a dependency from a (custom) thread task. A dotted arrow, from a waiter thread task 1901 to a notifier thread task 1902, represents a dependency from a blocking task to a (custom) thread task.

Figure 20:
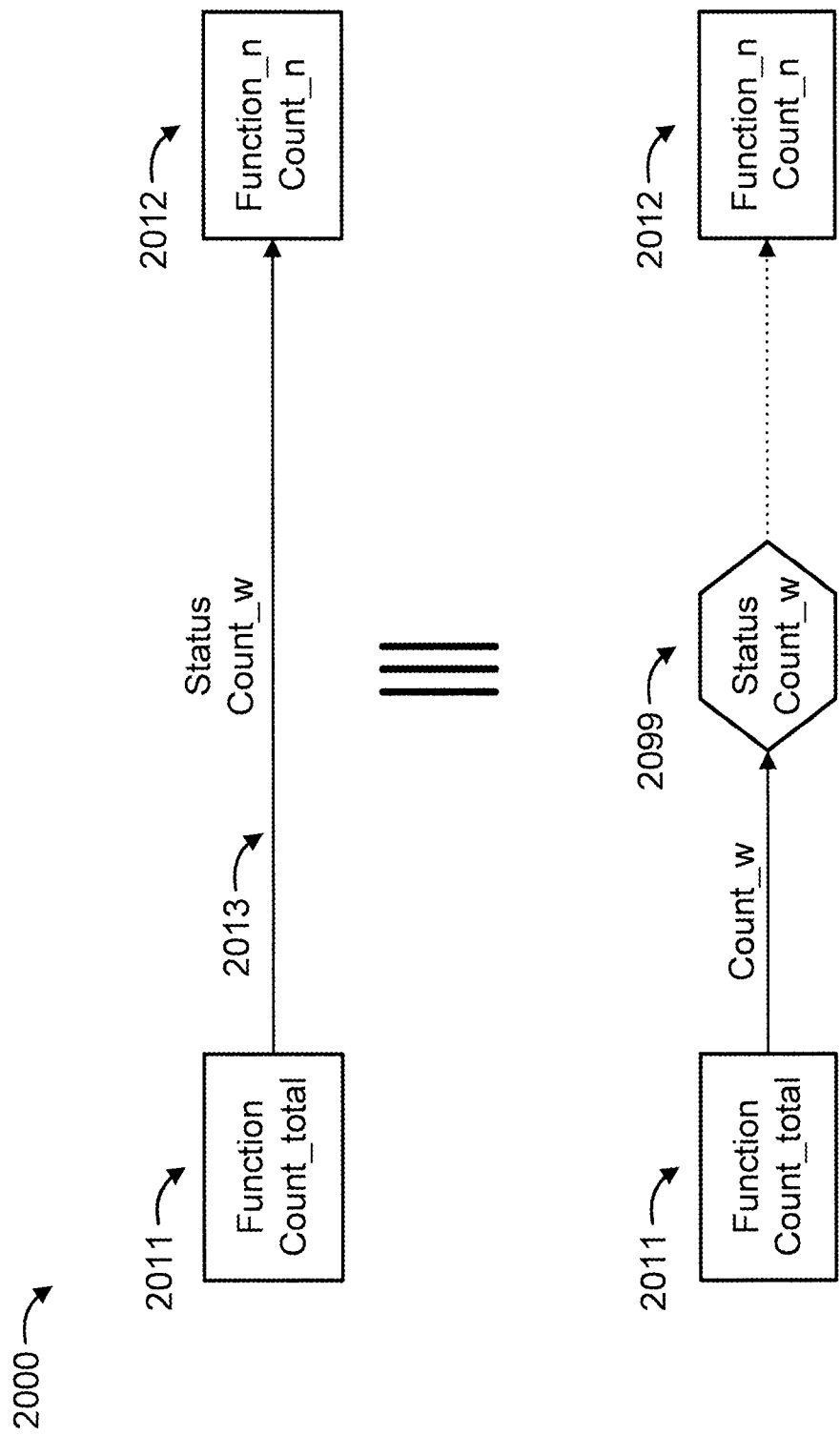
FIG. 20 is a diagram showing an exemplary shorthand notation of a task dependency graph, in accordance with an embodiment of the present invention.

FIG. 20 is a diagram showing an exemplary shorthand notation 2000 of a task dependency graph, in accordance with an embodiment of the present invention. The shorthand notation 2000 represents a dependency from a (custom) thread graph 2011 to a blocking task 2099 which depends on another (custom) thread task 2012 by omitting the blocking task 2099 and attributing the blocked thread status to an arrow 2013 from the waiter thread task 2011 to the notifier thread task 2012.

Figure 21:
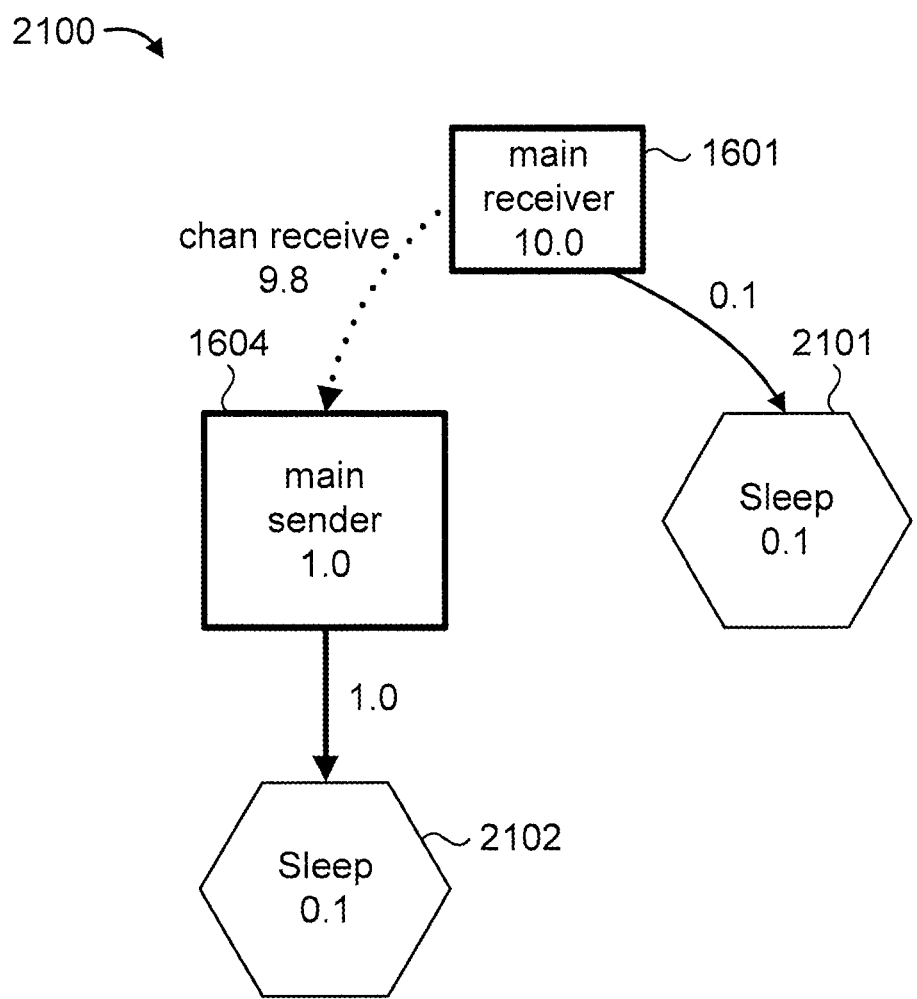
FIG. 21 is a block diagram showing an exemplary final task dependency graph, in accordance with an embodiment of the present invention.

FIG. 21 is a block diagram showing an exemplary final task dependency graph 2100, in accordance with an embodiment of the present invention. The final dependency graph 2100 includes nodes 1601 and 1604 from the task dependency graph 1600 of FIG. 16, as well as nodes 2101 and 2102. The bolded line (labeled "1.0") is created from a thread profile. The thin (non-bolded) line (labeled "0.1") is created from a wake-up profile. The dotted line (labeled "chan receive 9.9") indicates a dependency from a blocking task to a (custom) thread task.

A description will now be given regarding identifying/estimating dependency among threads, in accordance with an embodiment of the present invention.

For each channel, record: (a) the last thread which received a message from the channel, and (b) the last thread which sent a message to the channel.

For each mutex, record the last thread which acquired the mutex.

When a thread profile is sampled, estimate the dependent thread of a blocked or waiting thread as follows. If a thread is blocked at a mutex, it depends on the last thread which acquired the mutex. If a thread is waiting for a message from a channel, the thread depends on the last thread which sent a message to the channel. If a thread is blocked at sending a message into a channel, the thread depends on the last thread which received a message from the channel.

A description will now be given regarding extending an existing thread profiler for the purposes of the present invention, in accordance with an embodiment of the present invention.

Pprof of the Go programming language allows a user to sample a profile of threads.

A thread can be identified by its allocation site. In the Go language, it is the corresponding go statement.

While the existing goroutine profile does not show dependency among threads, it can be estimated by extending pprof.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 22:
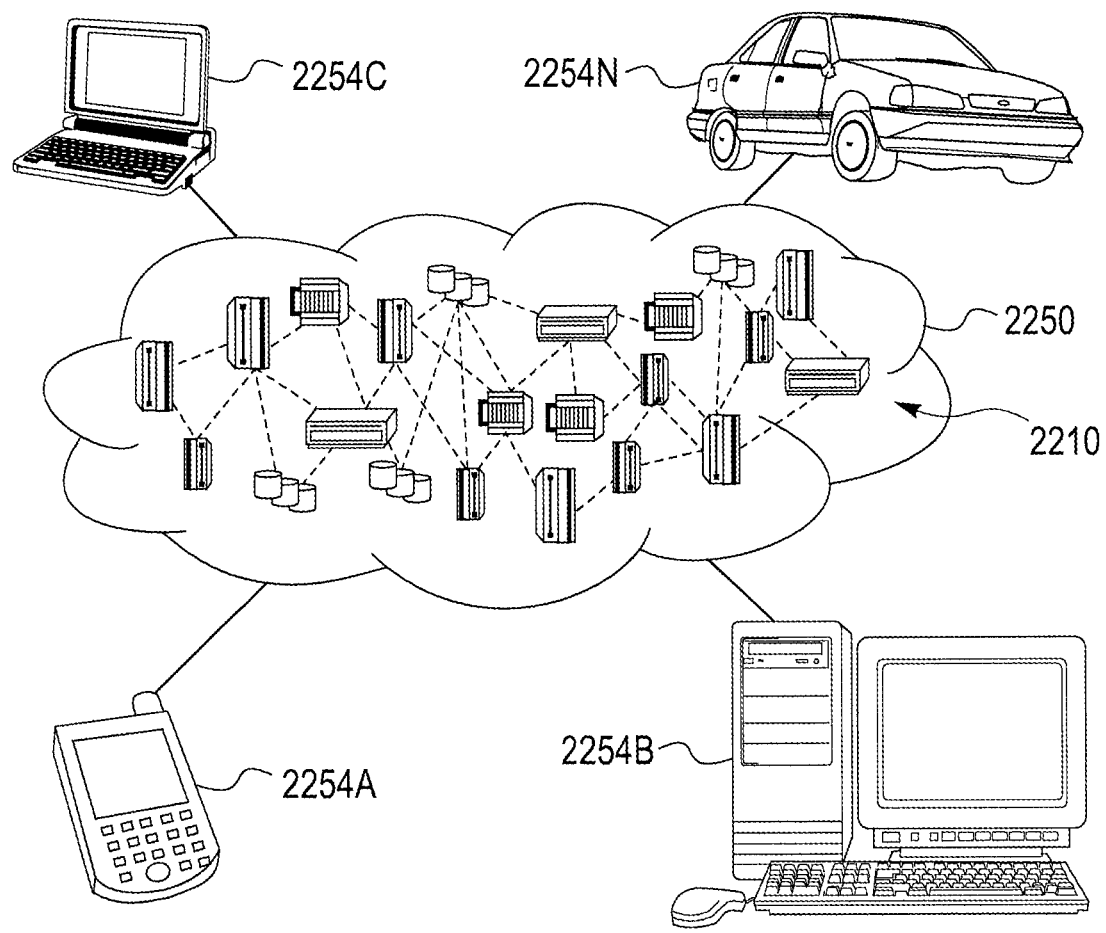
FIG. 22 is a block diagram showing an illustrative cloud computing environment having one or more cloud computing nodes with which local computing devices used by cloud consumers communicate, in accordance with an embodiment of the present invention.

Referring now to FIG. 22, illustrative cloud computing environment 2250 is depicted. As shown, cloud computing environment 2250 includes one or more cloud computing nodes 2210 with which local computing devices used by cloud consumers, such as, for example, personal digital assistant (PDA) or cellular telephone 2254A, desktop computer 2254B, laptop computer 2254C, and/or automobile computer system 2254N may communicate. Nodes 2210 may communicate with one another. They may be grouped (not shown) physically or virtually, in one or more networks, such as Private, Community, Public, or Hybrid clouds as described hereinabove, or a combination thereof. This allows cloud computing environment 2250 to offer infrastructure, platforms and/or software as services for which a cloud consumer does not need to maintain resources on a local computing device. It is understood that the types of computing devices 2254A-N shown in FIG. 22 are intended to be illustrative only and that computing nodes 2210 and cloud computing environment 2250 can communicate with any type of computerized device over any type of network and/or network addressable connection (e.g., using a web browser).

Figure 23:
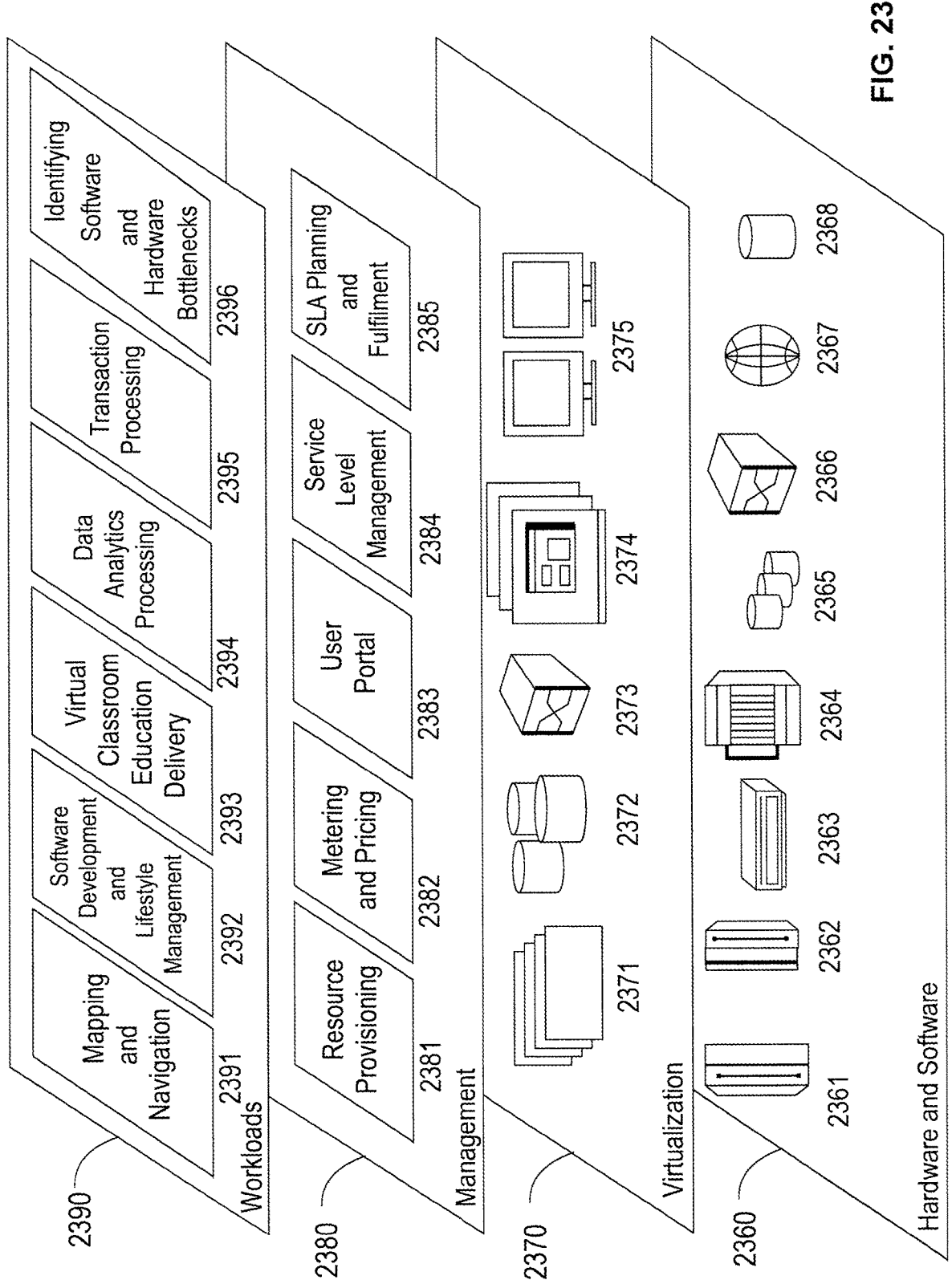
FIG. 23 is a block diagram showing a set of functional abstraction layers provided by a cloud computing environment, in accordance with an embodiment of the present invention.

Referring now to FIG. 23, a set of functional abstraction layers provided by cloud computing environment 2250 (FIG. 22) is shown. It should be understood in advance that the components, layers, and functions shown in FIG. 23 are intended to be illustrative only and embodiments of the invention are not limited thereto. As depicted, the following layers and corresponding functions are provided:

Hardware and software layer 2360 includes hardware and software components. Examples of hardware components include: mainframes 2361; RISC (Reduced Instruction Set Computer) architecture based servers 2362; servers 2363; blade servers 2364; storage devices 2365; and networks and networking components 2366. In some embodiments, software components include network application server software 2367 and database software 2368.

Virtualization layer 2370 provides an abstraction layer from which the following examples of virtual entities may be provided: virtual servers 2371; virtual storage 2372; virtual networks 2373, including virtual private networks; virtual applications and operating systems 2374; and virtual clients 2375.

In one example, management layer 2380 may provide the functions described below. Resource provisioning 2381 provides dynamic procurement of computing resources and other resources that are utilized to perform tasks within the cloud computing environment. Metering and Pricing 2382 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 2383 provides access to the cloud computing environment for consumers and system administrators. Service level management 2384 provides cloud computing resource allocation and management such that required service levels are met. Service Level Agreement (SLA) planning and fulfillment 2385 provide pre-arrangement for, and procurement of, cloud computing resources for which a future requirement is anticipated in accordance with an SLA.

Workloads layer 2390 provides examples of functionality for which the cloud computing environment may be utilized. Examples of workloads and functions which may be provided from this layer include: mapping and navigation 2391; software development and lifecycle management 2392; virtual classroom education delivery 2393; data analytics processing 2394; transaction processing 2395; and identifying software and hardware bottlenecks 2396.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for building calling context trees of a target application to identify a thread, from among multiple threads, or a hardware device, from among a set of hardware devices, affecting a throughput of a transaction relating to the target application, the method comprising:
    obtaining profiles of call stacks of the multiple threads;
    obtaining wake-up profiles which are the call stacks of a notifier thread and a waiter thread, from among the multiple threads, in a case that the waiter thread leaves from a sleep state;
    building the calling context trees to indicate transitions of methods tracing callee relations and wake-up relations based on the profiles of the call stacks and the wake-up profiles, wherein each of the methods is represented by a node having an average thread number; and
    extracting and displaying one or more tree portions, from among one or more of the calling context trees, which are transitively reachable from a calling context tree for the transaction and which include the thread or the hardware device affecting the throughput of the transaction.

2. The computer-implemented method of claim 1, further comprising reducing dependencies amongst at least some of the multiple threads using a task dependency graph.

3. The computer-implemented method of claim 1, wherein each of nodes of the calling context trees represents a stack frame of a thread.

4. The computer-implemented method of claim 1, wherein the calling context trees comprise invocation links from a node A to a node B representing that a corresponding function A invokes a function B in the profiles of the call stacks.

5. The computer-implemented method of claim 1, further comprising clustering nodes corresponding to the call stacks of synchronizing threads from among the multiple threads.

6. The computer-implemented method of claim 1, wherein said obtaining steps are performed by sampling the profiles of the call stacks and the wake-up profiles during a sleep interval.

7. The computer-implemented method of claim 1, wherein the wake-up profiles are obtained by linking the target application to a runtime library which samples events involving when one thread wakes up another thread, from among the multiple threads.

8. The computer-implemented method of claim 1, wherein said building step comprises:
    creating a respective parent node for each of stack traces in samples of a thread profile; and
    adding each of stack frames of the stack traces in a bottom-up order as a child node of the respective parent node.

9. The computer-implemented method of claim 8, wherein said building step further comprises:
    finding a child node which corresponds to a given one of the stack frames of the respective parent node;
    creating a new child node which corresponds to the given one of the stack frames of the respective parent node and creating a link from the respective parent node to the new child node, responsive to the searched child node being unfound; and
    incrementing a number of threads of the child node and setting the child node as a next parent node, responsive to the searched child node being found.

10. The computer-implemented method of claim 1, further comprising clustering nodes which correspond to stack frames of synchronizing ones of the multiple threads into a super node.

11. A computer program product for building calling context trees of a target application to identify a thread, from among multiple threads, or a hardware device, from among a set of hardware devices, affecting a throughput of a transaction relating to the target application, the computer program product comprising a non-transitory computer readable storage medium having program instructions embodied therewith, the program instructions executable by a computer to cause the computer to perform a method comprising:

obtaining profiles of call stacks of the multiple threads;

obtaining wake-up profiles which are the call stacks of a notifier thread and a waiter thread, from among the multiple threads, in a case that the waiter thread leaves from a sleep state;

building the calling context trees to indicate transitions of methods tracing callee relations and wake-up relations based on the profiles of the call stacks and the wake-up profiles, wherein each of the methods is represented by a node having an average thread number; and extracting and displaying one or more tree portions, from among one or more of the calling context trees, which are transitively reachable from a calling context tree for the transaction and which include the thread or the hardware device affecting the throughput of the transaction.

12. The computer program product of claim 11, wherein the method further comprises reducing dependencies amongst at least some of the multiple threads using a task dependency graph.

13. The computer program product of claim 11, wherein each of nodes of the calling context trees represents a stack frame of a thread.

14. The computer program product of claim 11, wherein the calling context trees comprise invocation links from a node A to a node B representing that a corresponding function A invokes a function B in the profiles of the call stacks.

15. The computer program product of claim 11, wherein the method further comprises clustering nodes corresponding to the call stacks of synchronizing threads from among the multiple threads.

16. The computer program product of claim 11, wherein said obtaining steps are performed by sampling the profiles of the call stacks and the wake-up profiles during a sleep interval.

17. The computer program product of claim 11, wherein the wake-up profiles are obtained by linking the target application to a runtime library which samples events involving when one thread wakes up another thread, from among the multiple threads.

18. The computer program product of claim 11, wherein said building step comprises:

creating a respective parent node for each of stack traces in samples of a thread profile; and adding each of stack frames of the stack traces in a bottom-up order as a child node of the respective parent node.

19. The computer program product of claim 18, wherein said building step further comprises:

finding a child node which corresponds to a given one of the stack frames of the respective parent node;

creating a new child node which corresponds to the given one of the stack frames of the respective parent node and creating a link from the respective parent node to the new child node, responsive to the searched child node being unfound; and incrementing a number of threads of the child node and setting the child node as a next parent node, responsive to the searched child node being found.

20. A computer processing system for building calling context trees of a target application to identify a thread, from among multiple threads, or a hardware device, from among a set of hardware devices of the computer processing system, affecting a throughput of a transaction relating to the target application, the computer processing system comprising:

a memory for storing program code, and a processor device operatively coupled to the memory for running the program code to obtain profiles of call stacks of the multiple threads;

obtain wake-up profiles which are the call stacks of a notifier thread and a waiter thread, from among the multiple threads, in a case that the waiter thread leaves from a sleep state;

build the calling context trees to indicate transitions of methods tracing callee relations and wake-up relations based on the profiles of the call stacks and the wake-up profiles, wherein each of the methods is represented by a node having an average thread number; and extract and display one or more tree portions, from among one or more of the calling context trees, which are transitively reachable from a calling context tree for the transaction and which include the thread or the hardware device affecting the throughput of the transaction.

* * * * *